(12) United States Patent
Graves et al.

(10) Patent No.: US 10,375,060 B1
(45) Date of Patent: Aug. 6, 2019

(54) SYSTEM FOR MOBILE CONTENT AND METADATA MANAGEMENT

(71) Applicant: BKON Connect, Inc., Nashville, TN (US)

(72) Inventors: Richard C. Graves, Nashville, TN (US); Chris Blanz, Nashville, TN (US); Kevin Huber, Nashville, TN (US); Greg Thornton, Nashville, TN (US); Beat Zenerino, Nashville, TN (US)

(73) Assignee: BKON Connect, Inc., Nashville, TN (US)

( * ) Notice: Subject to any disclaimer, the term of this patent is extended or adjusted under 35 U.S.C. 154(b) by 163 days.

(21) Appl. No.: 15/430,032

(22) Filed: Feb. 10, 2017

Related U.S. Application Data

(60) Provisional application No. 62/345,110, filed on Jun. 3, 2016, provisional application No. 62/293,515, filed on Feb. 10, 2016.

(51) Int. Cl.
*H04L 29/06* (2006.01)
*H04L 29/08* (2006.01)
(Continued)

(52) U.S. Cl.
CPC .......... *H04L 63/083* (2013.01); *G06K 7/1417* (2013.01); *G06K 19/06028* (2013.01);
(Continued)

(58) Field of Classification Search
CPC ............................ H04L 63/083; H04L 9/3226
See application file for complete search history.

(56) References Cited

U.S. PATENT DOCUMENTS 6,826,594 B1 * 11/2004 Pettersen .......... G06F 17/30893
705/59
7,024,552 B1 4/2006 Caswell et al.
(Continued)

FOREIGN PATENT DOCUMENTS

WO 200158098 A2 8/2001
WO 2009010401 A2 1/2009
(Continued)

*Primary Examiner* — Esther B. Henderson
(74) *Attorney, Agent, or Firm* — Patterson Intellectual Property Law, P.C.

(57) ABSTRACT

A mobile content management system includes a plurality of content source devices (beacons, QR codes, NFC tags) at respective fixed locations, each associated with a source URL comprising a hosted server domain and a unique identifier. The hosted server generates a hosted user interface enabling authorized designation of destination URLs and optionally associated preview metadata for respective content source devices. A hosted SDK-implemented mobile application residing on a client device, upon obtaining source URL(s), generates selectable tokens comprising the preview metadata corresponding to each of the respective content source devices, and further upon user selection of one of the tokens, generates a request to the hosted server comprising at least the associated source URL. The hosted server, upon receiving the request from the client device, generates a return message to the client device comprising at least one of the destination URLs designated for the respective content source device.

19 Claims, 9 Drawing Sheets

(51) Int. Cl.
  *H04W 4/02*     (2018.01)
  *H04W 12/06*    (2009.01)
  *G06K 19/06*    (2006.01)
  *G06K 7/14*     (2006.01)

(52) U.S. Cl.
  CPC .......... *H04L 63/0281* (2013.01); *H04L 63/06* (2013.01); *H04L 67/02* (2013.01); *H04W 4/023* (2013.01); *H04W 12/06* (2013.01)

(56) References Cited

U.S. PATENT DOCUMENTS

| | | |
|---|---|---|
| 7,038,584 B2 | 5/2006 | Carter |
| 7,146,293 B2 | 12/2006 | Badovinac et al. |
| 7,170,881 B2 | 1/2007 | Chaskar |
| 7,233,990 B1 | 6/2007 | Debaty et al. |
| 7,263,361 B2 | 8/2007 | Taylor |
| 7,299,256 B2 | 11/2007 | Pradhan et al. |
| 7,337,217 B2 * | 2/2008 | Wang .................... G06F 3/0481 386/E5.002 |
| 7,509,131 B2 | 3/2009 | Krumm et al. |
| 8,045,482 B2 | 10/2011 | Davis et al. |
| 8,200,816 B2 | 6/2012 | Izrailevsky et al. |
| 8,396,485 B2 | 3/2013 | Grainger et al. |
| 8,665,154 B2 | 3/2014 | Lin et al. |
| 2002/0152273 A1 | 10/2002 | Pradhan et al. |
| 2010/0148954 A1 | 6/2010 | Bobier |
| 2012/0246247 A1 | 9/2012 | Lim et al. |
| 2013/0065584 A1 | 3/2013 | Lyon et al. |
| 2013/0104038 A1 | 4/2013 | Galper et al. |
| 2013/0217332 A1 | 8/2013 | Altman et al. |
| 2013/0226704 A1 | 8/2013 | Fernandez |
| 2013/0251216 A1 | 9/2013 | Smowton et al. |
| 2013/0290070 A1 | 10/2013 | Abraham et al. |
| 2014/0143060 A1 | 5/2014 | Fernandez |
| 2014/0181256 A1 | 6/2014 | Trifa et al. |
| 2014/0222573 A1 | 8/2014 | Middleton et al. |
| 2015/0005011 A1 | 1/2015 | Nehrenz et al. |
| 2015/0088980 A1 * | 3/2015 | Lakes ............... G06F 17/30876 709/203 |
| 2015/0140933 A1 | 5/2015 | Muller et al. |
| 2015/0140982 A1 | 5/2015 | Postrel |
| 2015/0201329 A1 | 7/2015 | Daigle |
| 2015/0215737 A1 | 7/2015 | Shin et al. |
| 2015/0282046 A1 | 10/2015 | Shin et al. |
| 2016/0127875 A1 | 5/2016 | Zampini, II |

FOREIGN PATENT DOCUMENTS

| | | |
|---|---|---|
| WO | 20130108243 A1 | 7/2013 |
| WO | 2014210556 A1 | 12/2014 |

* cited by examiner

SYSTEM FOR MOBILE CONTENT AND METADATA MANAGEMENT

CROSS-REFERENCES TO RELATED APPLICATIONS

This application claims benefit of: U.S. Provisional Patent Application No. 62/293,515, dated Feb. 10, 2016; and U.S. Provisional Patent Application No. 62/345,110, dated Jun. 3, 2016, which are hereby incorporated by reference in their entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to systems implementing mobile content and metadata management. More particularly, this invention relates to the deployment and management of location-based technologies in the context of mobile content management systems. Exemplary embodiments of location-based technologies as described herein include a managed network of Bluetooth Low Energy ("BLE") beacons, near field communication (NFC) tags, QR codes and the like.

There are several protocols in the market over which such content source devices operate, including for example Apple's iBeacon protocol in the case of BLE beacons. The iBeacon protocol consists of a fixed length bit package (UUID/Major Identifier/Minor Identifier) that is in turn interpreted by compatible mobile Apps. However, in order to truly unlock the potential for interaction with any "smart device" upon demand, it would be desirable to reduce or eliminate the need for users to download an app associated with each respective group of devices. In keeping with the objective of rapid expansion of the Web into the physical world, it is therefore desirable to make the process of adding an element just as simple as adding a new web page.

Alternative and open source protocols such as UriBeacon and Eddystone-URL have been implemented, and may be referred to herein as Physical Web beacons, wherein the beacons broadcast a Uniform Resource Identifier ("URI") such as without limitation a Uniform Resource Locator ("URL") or uniform Resource Name ("URN"), in the context of accessing a network location such as a website address. As used herein, URI may refer interchangeably to a unique identifier associated with a beacon, a URN, or a URL, except in instances where the URL is specified as including the unique identifier associated with the beacon (the URI). The Physical Web (PW) has been promoted as a primary link between the physical world and the Internet, where places and things in can communicate via websites. Much like QR codes, PW beacons will be universally accessible to compatible apps and browsers, and will not require a custom App, as are required by, e.g., the iBeacon protocol.

The conventional mode of operation with a PW beacon is straightforward. One benefit of beacons that broadcast URLs rather than unique IDs is that any compatible application, collectively referred to herein as PW browsers, can retrieve the website associated with the URL broadcast by PW beacons. The most common use of a PW browser is that the user initiates a scan for nearby content, which displays a visual list of the metadata associated with nearby websites, whereupon the user selects one of interest and is directed to that website (URL). The experience is much like that from the common internet browser, which displays a snapshot of available websites based upon search terms, except that the user does not enter search term, but instead, the list of available websites is based upon proximity to the user.

With an administrative App designed to configure beacons, and when physically near to the target beacon, one can connect with a PW beacon and program it with the URI in combination with a network location and methodology of retrieving content from said destination—in practical terms a URL. The target beacon references this URI to broadcast the desired URL. A special browser executable from a client device is configured to read the broadcast from that beacon and connect to the destination URL in the normal way.

However, in order to connect to current Bluetooth beacons such as a UriBeacon or Eddystone beacon and change the URL which it advertises, the user must be physically near the beacon, because the process is accomplished over a Bluetooth low energy link, which has a limited range. This proximity requirement can be particularly problematic where the user wishes to implement and provide periodic updates for numerous beacons across an inconveniently large area, or otherwise make appropriate range settings for a suitable user experience. The associated need for an unfamiliar, and sometimes awkward, programming task (e.g., taking the beacon's batteries out, or pushing a button) inhibits an otherwise familiar and straightforward process. This task is made unmanageable for widely dispersed installations by the requirement to have to handle each beacon in order to adjust its settings. Therefore, it would be desirable to eliminate the requirement of locally and directly interacting with the beacon for configuration by enabling a network-based management platform for the plurality of beacons in a dispersed installation.

Further, another limitation of the Eddystone and UriBeacon protocol is that the maximum size of the advertisement data field is 17 or 18 characters respectively (at present), so for example:

www.xxxxYYYY.com fits fine, as opposed to:

https://github.com/google/uribeacon/tree/master/specification

For this reason, domain name shortening services are recommended and are commonly used with Eddystone beacons and UriBeacons. In the above example, if the second URL were plugged into the "Goo.gl" domain shortening application, the user would obtain http://goo.gl/Du29uS. If the user clicks on this link, he/she will be directed to the original link, but first must go to http://Goo.gl, where the link will be translated before redirection to the correct site. This one-to-one short-URL to destination-URL relationship can be problematic because the beacon is only allowed to broadcast a single shortened URL in reference to a third-party domain shortening service. For example, no additional URL information can be appended to the shortened URL, such as battery state or other sensor information tags so as to be passed through the URL to the destination location for contextual determination purposes. It would therefore be desirable to eliminate not only the step of interacting directly with the beacon, but further or at least in the alternative the need for third-party domain shortening applications for destinations having more than 18 characters, and to provide a methodology where contextual information appended to or embedded in a shortened URL by the beacon can be transferred to the associated destination URL.

Another problem in conventional applications is that websites currently have embedded content that is displayed by a browser upon search, commonly referred to as metadata. These typically include the website's title, its favicon, its description, etc. Because this information is embedded in the website, it is not easily changed without making direct changes to the website. For websites displayed on a beacon browser (e.g., PW browser) it would be beneficial if the website's metadata could be dynamically changed.

For example, if a restaurant's menu is on a website to be accessed and reviewed by people near to the restaurant, then it would be desirable to the restaurant owner to be able to change the title for that website (as displayed on a person's browser) to say "Meat Loaf Special today" or "2 for 1 PBR's" or "Free appetizer's for the next hour" or whatever message the restaurant wants to broadcast in order to capture the attention of passing consumers when they scan for location-based websites, and it is preferred that this can be done without having to change the underlying website.

Still another problem with conventional techniques is that beacons currently broadcast content through simple strings including URLs. As such, they are a powerful platform to make relevant content available to consumers in physical locations. However, if multiple beacons broadcast the same URL, then the source location of the user who accesses the beacons is lost. One reason for this is that many beacon browsers will retrieve the destination URL when the beacon is initially scanned, whereas that destination URL contains no reference to, or way of identifying, the originating location. Even if there is a code in the shortened URL, often all beacons use the same shortened URL to access the same destination URL, and because most PW browsers do not make a second call to a server when that URL is actually selected by the user, they cannot relate the shortened URL and the common destination URL when the destination is selected. It would therefore be desirable that when location based content is accessed, and when more than one location is associated with that content, that the point of origin of each access can be accurately identified.

Yet another problem with conventional Bluetooth beacon protocols such as iBeacon is that traditional beacons broadcast a static, unique ID associated with the broadcasting beacon. This static identifier creates security and privacy risks, as unauthorized individuals can easily obtain the beacon ID and "hijack" or "spoof" the beacon. This allows unauthorized users to duplicate the ID to fool other users or to track the location of a moving beacon by monitoring the proximity to the static beacon ID. It is therefore desirable to eliminate the need to for a static beacon ID in the beacon protocol, thereby improving network security and user privacy.

Turning to alternative implementations of content source devices, QR codes and NFC tags may also be attached to specific products located immediately next to other tagged products, such that consumers can choose a specific content or action of interest. However, QR code implementation in particular has some disadvantages with respect to user experience. For example, QR code implementation is a single step transaction that instantly takes a user to a destination, without a complete understanding of the associated content. The destination URL itself may be made available by certain conventional QR readers, but even then may provide no more than a shortened URL. A user may therefore be sent to a QR destination that is not secure, and/or includes content that is undesirable or inappropriate for the user. QR codes are also typically not location-aware, and multiple locations cannot be easily managed as a group while also maintaining discrete location awareness.

Another problem with conventional QR implementation is that they lack anti-spoofing or presence detection features.

Yet another problem with conventional QR implementation is that QR codes do not provide conditional content, enabling different content to be presented to users with different client applications or in view of other varying criteria. Generally speaking, QR codes do not allow content to be personalized, or to be restricted to authorized users, or to display different content to different audiences.

Yet another problem with conventional QR implementations is that QR codes are slow to render useful information to a user due to the necessity to visit the destination URL and download all the content from that website.

Yet another problem with conventional QR implementations is that the available metrics are minimally useful for determining the value to users of the underlying content. Typically, only a single "scan" metric is collected indicating the QR code was scanned; however, because users often have no preview information for the destination URL, a high number of scans may only mean that the QR code is in a visible location, rather than that its content is valued.

Yet another problem with conventional QR implementations is that they do not have the ability to offer a user multiple destination URL options prior to visiting a destination URL.

BRIEF SUMMARY OF THE INVENTION

Exemplary systems or methods according to the present disclosure provide a unique model of operation that tightly couples a content source device such as a Physical Web beacon or a QR code with a client browser or SDK and with a cloud based server (e.g., URI Management Server or "UMS"), thereby providing several major advantages over the traditional model.

One aspect of a cloud based web server system as disclosed herein is that it works within the familiar architecture of the web, fitting seamlessly into the existing architecture of common web pages and physical web devices. The present invention may offer powerful capabilities as centrally situated to monitor traffic between and among browsers interacting with its associated beacons and their destination web pages. The unique and central positioning with respect to a customer scan of his surroundings and the subsequent selection of a website, combined with previously unknown capabilities for location knowledge, enables the present invention to add critical intelligence to a transaction, unachievable in normal web interactions, benefiting both the consumers and creators of content.

In an embodiment, an exemplary system as disclosed herein integrates a plurality of content source devices at respective fixed locations. Each content source device, such as for example a beacon transmitter, a QR code, or an NFC tag, is associated with a source Uniform Resource Locator (URL) that itself comprises a domain associated with a hosted server and a unique identifier. The hosted server is configured to generate a hosted user interface, which enables authorized users to designate one or more destination URLs for respective content source devices. The system further integrates a hosted SDK-implemented mobile application residing on a client device, which obtains a source URL from one or more of the content source devices and thereupon generates one or more selectable tokens comprising preview metadata corresponding to each of the one or more content source devices. Upon selection by a user of one of the tokens, the client device generates a request to the hosted server that includes at least the associated source URL. The hosted server is further configured, upon receiving the request from the client device, to generate a return message to the client device that includes at least one of the destination URLs designated for the respective content source device.

In one aspect of the aforementioned embodiment, the hosted user interface may further enable the authorized user to designate preview metadata to be displayed in association with the one or more destination URLs for respective content source devices.

In additional aspects of the aforementioned embodiment, one or more of the destination URLs may, for example, be associated with a third party web portal. Another one or more destination URLs may be configured for regulating operating parameters for a controllable device, typically proximate to the client device, and further comprise command information and an identifier for the respective controllable device. Still another one or more destination URLs may be configured for a messaging application associated with the client device, and include contextual location information for a new message from the client device.

In another aspect, the request from the client device may include the source URL and one or more contextual information tags appended thereto by the mobile application. The hosted server may then, upon receiving the request from the client device, process the one or more appended contextual information tags and generate the return message to the client device based at least in part on one or more of the contextual information tags.

The appended contextual information tags may for example include variables associated with unique user identification and user-selected preferences set in the mobile application, wherein the hosted server generates the return message including one or more destination URLs based at least in part on one or more of the identified user and the user-selected preferences.

In another example, the appended contextual information tags may include a security key associated with a particular user having login credentials with the mobile application, wherein the hosted server generates the return message including a destination URL with secured content, based on the identified user and the security key. Each security key in a particular embodiment may be single-use in nature.

In another example, the appended contextual information tags may include a first set of appended contextual information tags, wherein the hosted server appends a second set of one or more contextual information tags to the destination URL in the return message to the client device. The hosted mobile application can thereby provide access to content or facilitate user actions based on one or more of the first and second sets of contextual information tags and the destination URL in the return message.

In still another aspect of the aforementioned embodiment, a first plurality of the content source devices may include proximately located QR codes, and the preview metadata associated with each of the QR codes may be dynamically generated in associated with sequential capture of the respective QR codes by a camera of the client device. The application camera may remain active as the client device moves, for example, from a first QR code to a second QR code, such that the selectable tokens generated from the preview metadata remain visible and active until the camera scans a following QR code, whereupon the visible selectable tokens will automatically change.

In still another aspect, the system may implement location detection or location validation features. For example, the request from the client device may include position information (e.g., GPS coordinates) appended to the source URL, as may be obtained from the client device, wherein the host server determines a location of the client device as proximate to the corresponding content source device, and at a particular time, and whereupon the host server validates the client GPS coordinated with one previously associated with the QR code in order to validate that the user is present with the QR code, and that the QR code has not been spoofed to another location.

As another example, the hosted server may, upon receiving the initial request from the client device, request validation of a location of the client device as proximate to the corresponding content source device. The client device accordingly already has control of the device camera in order to read QR codes, and it is already active because it is reading a QR, and thus it can respond by informing the user that an image will be captured in a defined period of time (e.g., five seconds) to validate the user's location, and with a request to point the camera toward the QR and its immediate surroundings. The client application responds to the validation request with one or more captured images of an area corresponding to a location of the content source device, and the hosted server is configured to either upon validating the location of the client device via processing of the captured images, or to store the captured image for later visual validation for applications such as security guard check-in, and then to generate the return message with at least one of the destination URLs designated for the respective content source device.

As another example, the request from the client device may include identifiers for one or more beacon transmitters proximate to the client device, wherein the host server is configured to determine a location of the client device as proximate to the corresponding content source device. Embodiments of a hosted system or method as disclosed herein may therefore provide network trigger points. Because hosted beacons as disclosed herein may typically have a unique broadcast ID, which cannot be copied or spoofed, they may be used as triggers for other applications, or as highly reliable location identifiers.

DETAILED DESCRIPTION OF THE INVENTION

Figure 1:
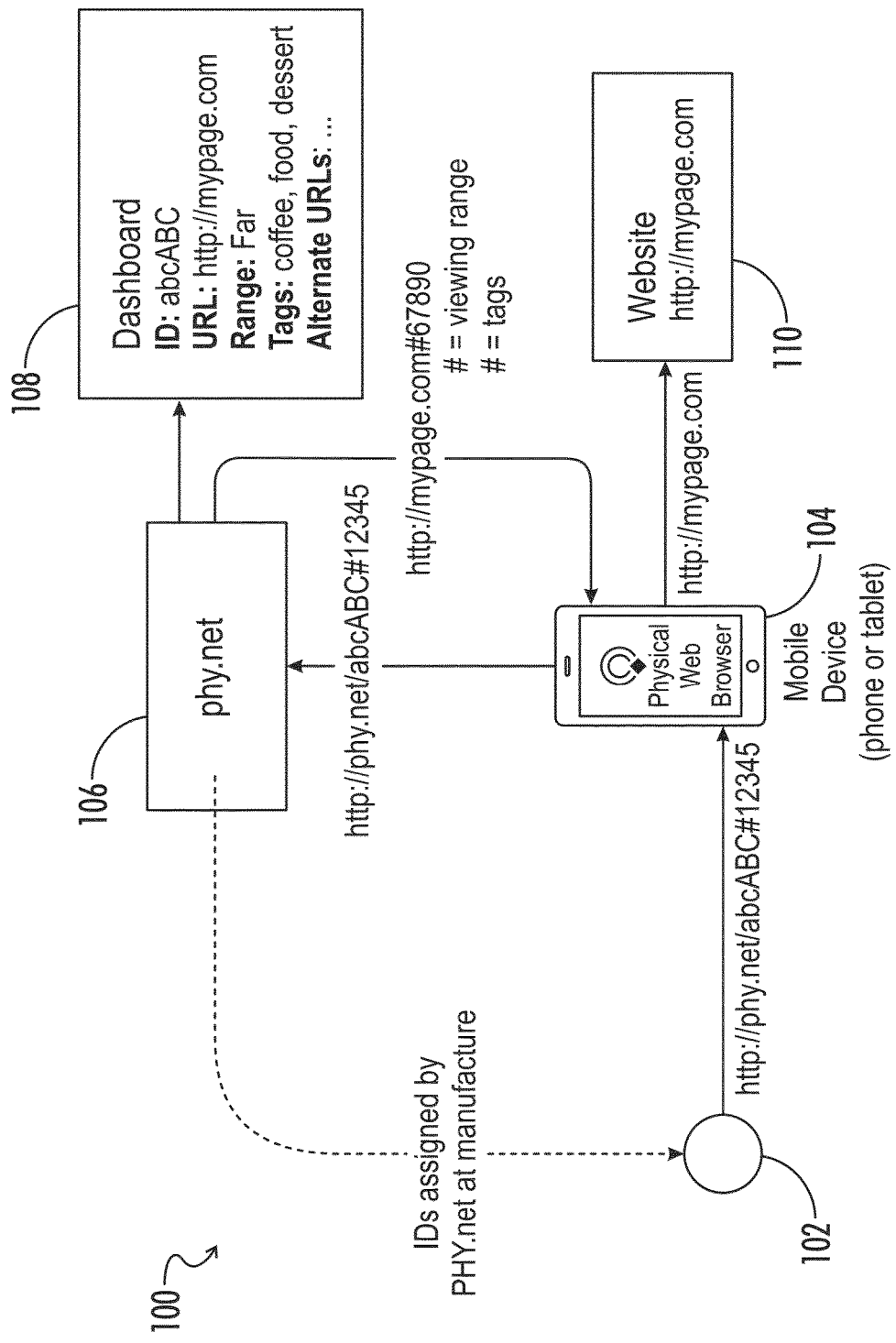
FIG. 1 is a flow diagram representing an embodiment of a hosted web server system according to the present disclosure.

Referring generally to FIGS. 1-9, various exemplary embodiments of an invention may now be described in detail. Where the various figures may describe embodiments sharing various common elements and features with other embodiments, similar elements and features are given the same reference numerals and redundant description thereof may be omitted below.

Referring first to FIG. 1, an exemplary embodiment of a system 100 as disclosed herein may include a plurality of content source devices 102. The term "content source device" as used herein may encompass at least URL-based proximity technologies that may be provided in a fixed location, specifically including but not limited to QR codes, NFC tags, and BLE beacons that are configured to support some or all of broadcast options including without limitation Eddystone beacon protocols, QR encoded URLs, UriBeacon protocols, RFID tag broadcast, and the like.

Beginning with an embodiment pertaining to BLE beacon implementation, broadcast messages from any one or more of a plurality of beacons may be transmitted to proximate mobile computing devices 104 such as for example phones, tablets or the like, wherein such devices are capable of receiving the broadcast messages. A hosted web server 106 is further communicatively linked to the device or otherwise accessible via a communications network. The server is configured to direct a browser or application of the mobile computing device 104 to content via for example a destination URL 110, with the content corresponding to a particular beacon 102 being designated in various embodiments by an administrator or the like via a hosted user interface 108 in association with the hosted web server 106.

In a particular embodiment, a hardcoded URI may be used with a UMS hosted domain (e.g., http://YYY.net or http://ZZZ.biz) as the base link for this URI, followed by a unique beacon identifier, that is a 6-character alpha identifier in the initial implementation, but may be alphanumeric and may also use less or more than 6 characters for the identifier. Because the beacon identifiers may typically be assigned at manufacture or at beacon setup by the host and managed by the corresponding cloud based UMS, they are guaranteed to be unique, and the field length will be expanded if necessary. An example would be: http://YYY.net/AkfGGy, where the identifier/serial number for that beacon would be "AkfGGy". This identifier may in certain embodiments be physically printed on or otherwise visibly discernable with respect to the beacon and/or its packaging, and the default setting of the beacon may be to broadcast this fixed URI (http://YYY.net/AkfGGy).

As previously mentioned, one advantage to various embodiments of the disclosed system is that those who set up hosted beacons 102 do not have to interact directly with (i.e., in substantial proximity to) beacons with a configuration App to program their destination URL. Setting or changing a beacon's destination URL can be accomplished without ever having to connect with the target beacon over the traditional Bluetooth connection, which requires one to be physically present with the beacon. Users simply have to read the beacon's Unique ID, which is printed on the beacon, go to the web portal 108 for the UMS, and enter the destination URL there in a field associated with the beacon's identifier.

In an embodiment, a system 100 as disclosed herein may incorporate a functionality in the cloud based URI Management System (UMS) that translates a beacon's fixed URI into a desired URL link. As but one example, if beacon 102 with identifier # AkfGGy is to be directed to point to a destination website with the URL of www.Xyz.com, a user is not required to be physically near the beacon itself in order to edit the beacon's URI field, but instead may simply go to the UMS web portal 108 which enables the user to associate the beacon having identifying sub-directory http://YYY.net/AkfGGy (wherein "YYY.net" represents the hosted UMS server address as described herein) to destination URL www.Xyz.com.

In one example of a typical beacon operation, when a user with a browsing mobile device 104 selects the destination website, the browser will automatically link to a website 110 associated with the destination URL as was entered in the UMS server by the beacon's administrator. Typically, the destination URL may be associated with a third party website, content management system, and the like. In some contexts, the destination URL may direct the browser to a hosted content server, whereupon the host will directly present the desired web content.

In certain embodiments, additional information may be embedded into the desired URL link to add contextual information to be processed by one or more of an application upon the mobile device 104, by the UMS cloud server 106, or by the content server of the destination URL. For example, the UMS may add in addition to the unique, fixed URI a proximity component which informs the mobile device 104 of the range at which the mobile device should display the content of a nearby beacon 102. As another example, the beacon itself may embed not only its unique identifier, but also additional information such as an indicator of battery state and/or other sensor outputs. The UMS upon receiving an associated message (content request) from the mobile device may then extract the embedded battery state variable, update its management database, and then discard that variable or otherwise add/embed it to the destination URL if desired.

In certain embodiments, other sensory data may be embedded in the initial URL as broadcast by the beacon via information tags such as, but not limited to: movement detection, sound detection, temperature, and light level. The UMS cloud server 106 may process these information tags in accordance with instructions and provide the beacon administrator information via the UMS web portal 108. The UMS cloud server may identify a destination website 110 to be returned to the browser from among a plurality of options based on the contextual information provided via the URL-embedded information tags. In embodiments wherein the UMS is also the content server, it may populate certain content upon user selection of the associated website 110 with different information based on the contextual information provided via the URL-embedded information tags.

The mobile device may further add contextual information regarding for example the associated user, wherein this additional information from the beacon and/or mobile device is added to the original URL with the domain of the UMS. The relevant additional information and/or associated contextual variables, as appended to or otherwise embedded within the URL received by the UMS, may subsequently be added to the destination URL by the UMS.

One of skill in the art may appreciate that numerous advantages offered by the aforementioned architecture are readily available for alternative content source devices 102 such as QR codes or NFC tags. For example, an appropriately configured client device may scan a QR code having an encoded source URL with the hosted server domain and a unique identifier, wherein the remainder of the subsequent client device-implemented and hosted server-implemented or enabled operations may be substantially identical. Additional advantages provided by the system and methods as disclosed herein may further be enumerated specifically with respect to the QR code implementation, however, and with reference to certain problems in conventional QR code implementation as described above.

Figure 2:
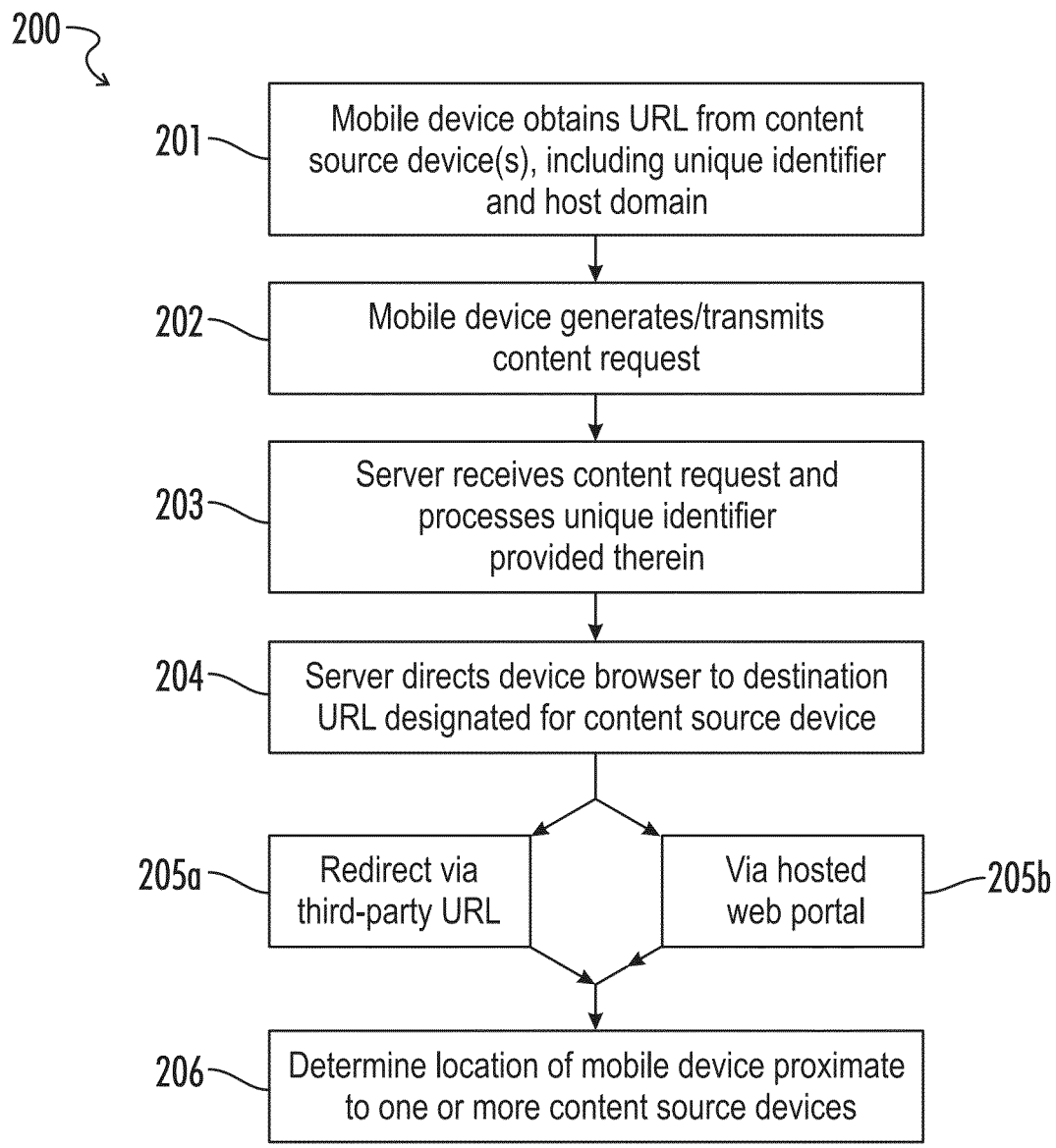
FIG. 2 is a flowchart representing an exemplary embodiment of a process for directing content source device-specific content to a mobile device browser as implemented by the system of FIG. 1.

Referring next to FIG. 2, an exemplary method 200 as disclosed herein for providing some or all of the aspects referenced above may be described as follows. Depending on the embodiment, certain acts, events, or functions of any of the algorithms described herein can be performed in a different sequence, can be added, merged, or left out altogether (e.g., it may be not all described acts or events are necessary for the practice of a given process or algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

The method 200 may be characterized in part wherein each of a plurality of beacon transmitters are configured to implement a first step 201 wherein one or more beacons transmits via a wireless protocol one or more messages including at least a unique identifier. The unique identifier may take the form of any identification component sufficient to uniquely identify the beacon. The message may in certain embodiments be a URL, wherein the URL contains the unique identifier. In further embodiments, the message may be a shortened URL of 18 characters or less in accordance with for example Eddystone-URL and UriBeacon limitations.

The method 200 may continue with a second step 202 wherein a mobile device proximate to one or more of the beacons receives the one or more corresponding transmitted messages, and further generates a content request in association with the received message or messages from the beacon, and transmits the content request via a communications network to a UMS cloud server. In an embodiment wherein the received message is a URL, the mobile device's generated content request may take the form of the same received URL to be submitted via a browser on the mobile device. As previously noted, the mobile device may obtain a source URL not only by receiving transmitted messages from a hosted beacon, but also by scanning a QR code and decoding an associated source URL therefrom, wherein the remaining steps in the method may be equivalently performed.

In various embodiments, the mobile device's generated content request may append, modify, or substitute the obtained source URL with additional tags or other information to provide added context. For example, upon obtaining a source URL, the mobile device may append to the source URL information tags which convey information about the device's user, phone state or phone sensor data.

In certain embodiments, the mobile device may generate a content request via an application installed on the mobile device, wherein the application appends, modifies, or substitutes information to the received message in accordance with application-specific parameters. For example, an application may add information tags sufficient to identify user, the application, the mobile device being used, the type of mobile device being used, and information specific to or received by the mobile device, user-inputted information, and the like.

The method 200 may continue with a third step 203 wherein the host server receives the content request from the mobile device and authenticates the beacon corresponding to the content request according to the unique identifier provided therein and in relation to the beacon's unique identifier. In an embodiment, the beacon may be authenticated according to a process as further described below by reference to FIG. 3. The server may fail to authenticate the beacon in accordance with a unique identifier, such as if the beacon's unique identifier does not comply with a server-stored key. Such instances may occur where an insecure beacon "spoofs" a secure beacon and attempts to deliver a message reserved for the secure beacon. In such instances, the server may reject the content request and terminate at this step, or it may alternatively continue to step 204 wherein the content to which the device browser is directed is designated for unauthenticated beacons.

The hosted server may further, or in the alternative, require presence detection or location validation from the client device as a prerequisite for continuing to step 204. For example, conventional QR codes and NFC tags are generally unable to satisfy "anti-spoofing" requirements, in analogous fashion to the aforementioned process. Such presence detection features may for example be as described below with respect to step 206.

In an embodiment, the host server may receive and process certain information in the content request in accordance with analytical information unrelated to the destination address and associated content to be designated in step 204. For example, the content request may contain non-content information including the battery state of the beacon, sensory data, and other contextual information which may be useful for marketing analytics or for other purposes.

The method 200 may continue with a fourth step 204 wherein the host server generates a return message to the mobile device including a destination URL. In an embodiment, the return message from the server may direct the client device to content in association with a device application as opposed to a browser, wherein the designated content is to be populated in the mobile device application. In other words, because a system as disclosed herein is based on a first (host identifying) URL as obtained from the content source device and a second (destination) URL generated by the host server, users can access content either through compatible browsers or device applications, thus making content more universally accessible.

The destination URL may alternatively be associated with action items as further described below, with respect to for example controllable proximate devices or messaging applications.

In relevant embodiments, the server may determine the destination URL designated for the unique beacon based in part on the additional informational tags included in the content request. The server may further append or include information tags to the determined destination URL based in part on designated inputs from the beacon administrator via the hosted web portal. For example, the server may direct the mobile device browser or application to presentation of the destination URL in accordance with satisfaction of administrator-designated threshold parameters as further may be determined by the mobile device browser or application itself, based on tags including without limitation: user proximity to the beacon, user identity, application type, phone type, time of day, user search query, etc. As a more specific example, one set of content may be designated for authorized users proximate to a content source device, whereas another set of content may be designated for unauthorized users proximate to the same content source device. In another example, users of one client application will access one set of content while users of a general browser or of a different client application can access different content.

The host server may direct the device browser to designated content via a third-party URL (205*a*) or alternatively via a hosted web portal (205*b*). In step 205*a*, the server may redirect to content hosted via a third-party, which will identified by its URL. In certain embodiments, the server may generate a third-party URL including URL tags such as UTM information, the beacon ID, a mobile device supplied user ID, or queries by which the third party website can process information and display content in association with the content designation of the server upon the mobile device. Alternatively, in step 205*b*, the server may provide a destination URL associated with a hosted content server, wherein the device browser may be selectably redirected to hosted content thereby.

The method 200 may continue with a step 206 wherein the host server is configured to determine a location of the mobile device as proximate to one or more of the networked content source devices. This step may be distinguished from purely a determination of distance from, or direction with respect to, a particular content source device, but rather relates to a determination that the mobile device and by extension an associated user is physically proximate to said content source device. Accordingly, the UMS is able to provide positive confirmation, for example to the administrator or simply for internal analytics, that the person accessing a destination website is in near proximity to that content source device at that particular time, as opposed to general access as may be obtained from any Internet connected device regardless of location or for example at a later time.

In an embodiment, the client device may utilize position sensing technology that is already available on the device, such as for example a GPS transceiver, wherein position data such as GPS coordinates can be appended to the source URL in the initial request. The hosted server can process the GPS coordinates with respect to defined coordinates associated with the content source device in order to validate that the client device is actually positioned proximate to the content source device based upon a GPS location previously associated with the content source device.

In another embodiment, the client device may generate the content request including not only the source URL from a QR code, for example, but also may include information including unique identifiers associated with one or more beacon transmitters proximate to the client device. The hosted server may accordingly validate the location of the client device with respect to the QR code, by way of comparison with the known locations of the respective beacon transmitters as retrieved from within the hosted system.

In other embodiments, the hosted server may request validation of the client device location from the client device after a content request has been received but prior to generation of a reply including the destination URL. In one example, the hosted server may respond with a request for an image capture of the area surrounding the QR code that may be forced and automatic since the application has control of the client camera. The user, having already recently utilized the image capture functionality of the client device, needs only to adjust the scale of the subsequent image capture and send the new image back to the hosted server for comparison and validation with respect to images stored thereon and for that objective. Alternatively, the hosted server may request a client device scan for one or more particular beacon transmitters that the hosted server determines to be in the purported location of the client device. Even in the context where the client device did not automatically attach identifiers associated with such beacon transmitters in the original content request, they may be configured to respond to such a location validation request from the hosted server, whether automatically or by manual submission by the user.

Figure 3:
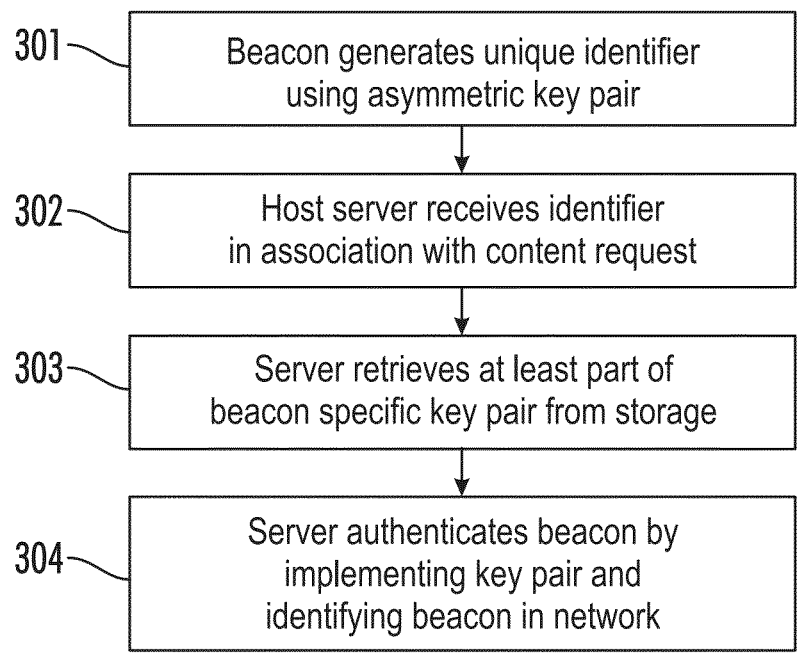
FIG. 3 is a flowchart representing an exemplary process of beacon authentication according to the present disclosure.

Referring now to an exemplary process 300 for beacon authentication (and/or presence detection) as illustrated in FIG. 3, two unique codes may be embedded in the firmware of each of a plurality of hosted beacons at the point of manufacture. Because these codes are issued and are managed by the UMS, they are always guaranteed to be unique and they are also stored in a corresponding file on the hosted cloud UMS server permanently associated with the target beacon.

In an embodiment, the unique codes are public and private keys in an asymmetric key pair as may be implemented for server-side authentication of broadcasts for a respective beacon. The first code may be the beacon's unique ID, which is its public ID. It is this code that is publicly associated with (e.g., affixed to, printed on) the beacon, and it is this same code that one uses to access the associated file in the hosted server where the destination URL is entered (or where web content is directly hosted). The second code is the private passkey that is never exposed, and which is used in conjunction with an encryption algorithm to confirm to the host's cloud server the unique identity of each beacon.

While the private passkey could be the beacon's unique MAC address, such an implementation may typically not be recommended for reason that it complicates manufacturing by necessitating the recovery of the MAC address associated with a beacon ID during the manufacturing process for use in the UMS, if one is to avoid having to pair with the target beacon during deployment.

With respect to the aforementioned process 300, the algorithm references a beacon's private passkey to continually change its identifier (step 301), which pattern can be uniquely recognized by the hosted server (step 302) because it has the beacon's passkey. In an embodiment, the system may generate authenticatable messages with each new identifier/security key, the respective identifier having been generated via encryption techniques using the private passkey. In one embodiment, the host causes its beacon to broadcast the respective security key as a dummy sub-directory of the URL being broadcast, as data following a "#" separator, or the like.

For example, if the beacon ID is "KLtHbr" and its momentary security key is "6H8k9", then the URI that the beacon will broadcast will be www.KLtHbr/6H8k9. Pursuant to a content request associated with said broadcast, the hosted server will use the "6H8k9 sub-directory" to identify the beacon and then will discard this identifying sub-directory (step 303). In alternate embodiments, the system may use a separator such as for example a "#" (or equivalent alternative) between the public beacon identifier and the security key, or no separator at all, where the UMS server knows the field length of the ID and the Key. Finally, the server (step 304) authenticates the beacon by retrieving and validating the asymmetric key pair and identifying the beacon in the network.

A monitoring feature for the beacon power supply (e.g., internal battery) may be added within the framework previously described. Because the beacon is broadcasting a URI that might look like: http://phy.net/HYHKuu#278iM, with the last field being the changing security key based upon the private key embedded into each beacon, we can easily have the beacon also send a reading of its battery's voltage level in the same field, which will allow the host server to interpret and thus monitor battery state. Similarly, beacons may include many different sensors and the sensor data from any of these beacons may be transmitted in the additional transmitted date. Alternatively, depending upon the number of characters required to implement security, the security key may be transmitted in alternate broadcast from the sensor data to allow both to be transmitted.

In one particular example as provided herein for further illustration, the server has received the above URI: http://phy.net/HYHKuu#278iM. The server interprets the key "278iM" for security and battery state, and then discards the number. Typically, it would then return the destination URL (http://destinationwebsite.com) to the requesting browser so that the browser may then view the requested web page. In an embodiment, the server as disclosed herein may further provide any amount of additional information to improve the customers' experience. This may be accomplished by providing coded information in addition to the destination URL. An exemplary transmission from the server to the browser may look like or equivalent to the following: http://demo-url.com#8NJHRF, where additional information about the desired user experience is added after a "#" separator (or other character, which separator will serve to introduce the coded information). Although the additional coded information here is represented with six alphanumeric characters, it should be noted that in this context the coded information is not limited to the same, and may be substantially more complex or lengthy as desired. Alternatively, the UMS may transmit a file to the browser, which includes the additional information.

In an embodiment, the first information provided by the server to the browser is the desired viewing range. Using an example of an art gallery to describe the problem being solved, if one were in a gallery room, with six pieces of art on each of four walls, and each piece had Physical Web beacon attached, then a consumer would typically see all twenty-four pieces of art with her web browser, and possibly a few more from adjacent rooms. This makes it harder to identify and select the one piece of art in front of which the viewer is standing. Today one can mitigate this problem by individually turning down the transmit power of the radios in each of the beacons, which is a cumbersome task at least for the reason that again, it required one to be near to and to "pair" with the beacons to be adjusted.

Figure 4:
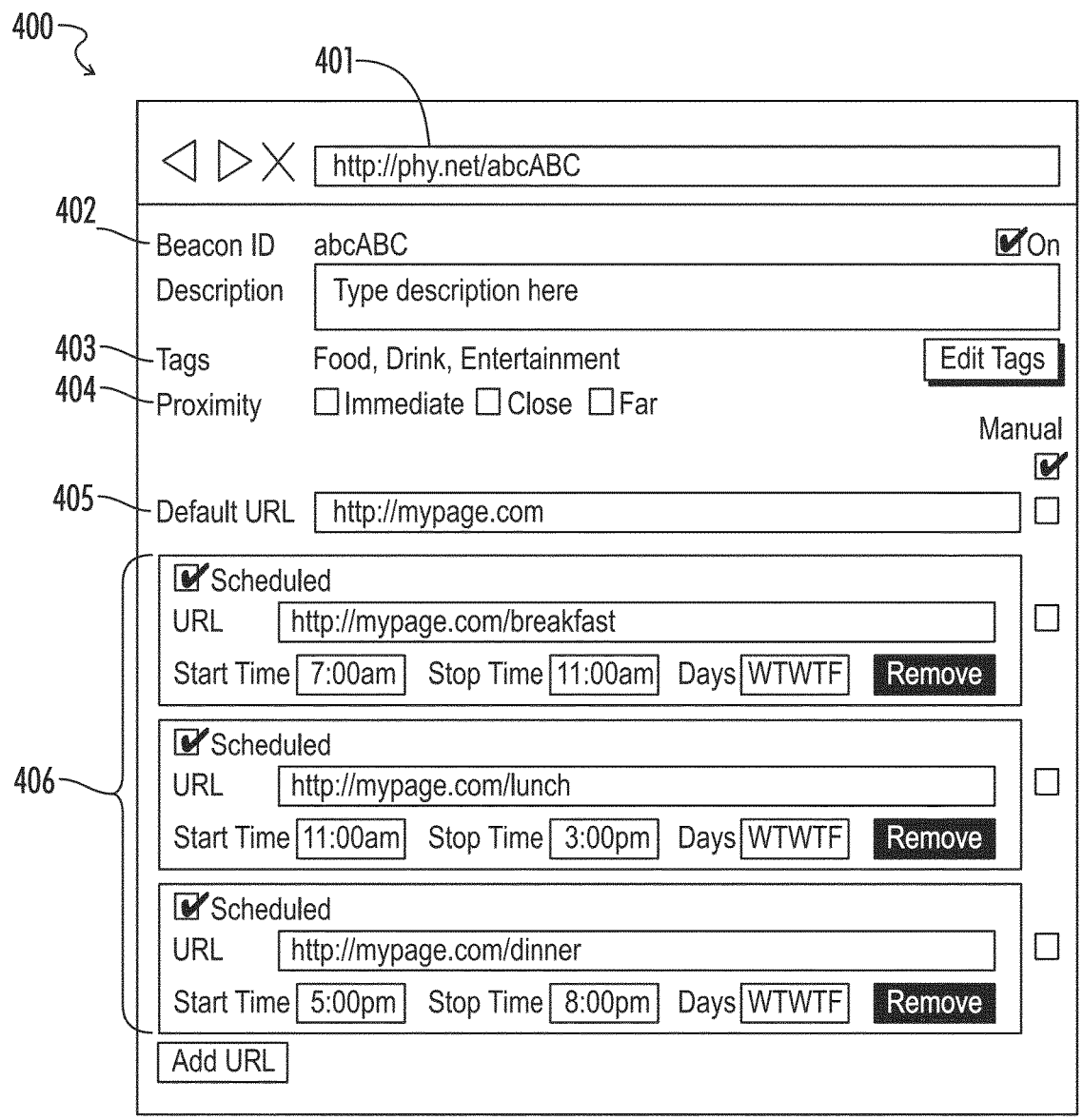
FIG. 4 is a graphical diagram representing an embodiment of a hosted user interface according to the present disclosure.

By utilizing systems and methods as disclosed herein, and with further reference to FIG. 4, one can set the desired viewing range by simply checking a box indicating at a hosted administrative web portal 400. This is the same portal where the destination URL 405 may be set. The interface might work for example where a beacon having ID# Ah8unT 402 is pointed toward destination URL http://demo-url.com and has a designated viewing distance 404 of "IMMEDIATE", which would cause one to see this URL on a hosted web browser if one is within a certain proximity, such as for example about approximately three feet of the piece of art. By using this method, the administrator is not adjusting the transmit power of the beacon, but instead passes back to the viewing browser the range at which it should make the website (in the coded message #8NJHRF) available for user selection, such that the browser, which can measure range because of its ability to monitor the beacon's signal strength, can then make use of this preference to decide whether to display the website, or alternately, how to rank it on the browser display.

In another aspect according to the present disclosure, tagging options 403 may be facilitated in a similar way, where the user will be able to choose on the UMS server portal the TAGs that should be associated with a website. A plurality of tags may be listed in the host server administrative portal, wherein the user can check those that apply to the beacon's location, and further pass this information to the browser in the coded message after the "#" or other separator, wherein the browser can use these tags to filter and rank content. In various embodiments, these tags may also be returned as query codes.

For example, if a beacon is located at a restaurant, and is alternately pointed to either the menu or to a promotional deal, then one might check the "FOOD" tag and the browser would know to show this content first if the consumer was looking for food, while similarly not ranking highly the apartment for rent above the restaurant tagged as "REAL ESTATE".

Various embodiments of systems and methods as disclosed herein therefore enable people who deploy beacons to be able to simply enter basic information about those beacons, including viewing range and location description, and to be able to automatically present this information as an addition to the destination URL, so that the browser can use it to display information in a manner most relevant to a consumer. As noted otherwise herein, one of skill in the art may appreciate that the information conveyed may be about more than the beacon, and may be about or otherwise facilitate personalizing the experience by providing information that influences what content is rendered on the destination web page.

Systems and methods as described herein further enable the provision of "conditional" content. Referring back again to the example of an art gallery as described above, a content source device may be fixed in a location relative to each of a plurality of displayed works in a gallery tour, wherein a basic content destination URL may be provided to a first subset of users, but further wherein a different and "premium" content destination URL may be provided to a second subset of users. Equivalent distinctions may be available for any number of applications as may be appreciated by those of skill in the relevant arts.

One additional benefit of this approach is that the UMS administrative portal will also allow one to set up and pre-designate alternate destination web pages for a beacon and simply swap between them, or to automatically swap between them according to a predetermined schedule. For example, again by reference to a portion 406 of the user interface 400 in FIG. 4, a first destination URL (e.g., https:/mypage.com/breakfast) may be designated for content requests from a client device browser occurring between 7:00 am and 11:00 am, while a second destination URL (e.g., https:/mypage.com/lunch) may be designated for content requests from a client device browser occurring between 11:00 am and 3:00 pm, and a third destination URL (e.g., https:/mypage.com/dinner) may be designated for content requests from a client device browser occurring between 5:00 pm and 8:00 pm, etc.

Additional service enhancements when one makes use of a host web server to enhance, translate and augment the information broadcast by a Physical Web beacon. For example, in one embodiment a user may manage destination website metadata (e.g., pertaining to favicons, titles, descriptions and the like) at the host server level. The host server could return these selections to the browser in place of the metadata embedded in the destination web site, thus allowing the administrator to make easy changes to the information that will appear on the consumer's search display to describe the destination website.

As referred to herein, hosted "preview metadata" may generally encompass metadata including but not limited to favicons, titles and/or descriptions which may be visually displayed in accordance with selectable tokens on a client device user interface, as designated by authorized users via a hosted user interface and further in association with specific content source devices. In what may further be described as a "preview mode," a browser as disclosed herein may improve upon conventional tools, particularly for example with respect to QR code implementation, by displaying a content-rich preview of the underlying content or actions associated with the destination URL. In contrast to conventional tools that merely provide the destination URL (or a shortened version thereof), a system according to the present disclosure demonstrates relatively dynamic and customizable information to the consumer with respect to an underlying destination.

In an embodiment, the preview metadata may be implemented in the context of split screen functionality, wherein a camera or equivalent imaging device associated with the client device is maintained in an active state to allow the preview metadata viewed by the user to change dynamically as the QR reader moves from a first QR code to an adjacent or otherwise "second" QR code in a sequence of relatively adjacent content source devices. As opposed to conventional applications wherein a particular QR code points directly to an associated destination URL, and the user must decide whether to consume the associated content or revert back to the reader, a hosted SDK-implemented application as disclosed herein enables the user to scan through multiple "previews," while continually scanning additional content source devices (e.g., QR codes).

In an embodiment, the associated token and/or metadata may be generated in the form of an augmented reality (AR) token that is generated in superimposition and optionally occlusive with respect to the underlying captured images. For example, upon scanning of an underlying content source device such as a QR code, the browser may generate a floating icon along with imagery and/or text indicating the nature of the underlying content or action to be implemented upon user selection, actuation or otherwise engagement of the token/icon.

Figure 9:
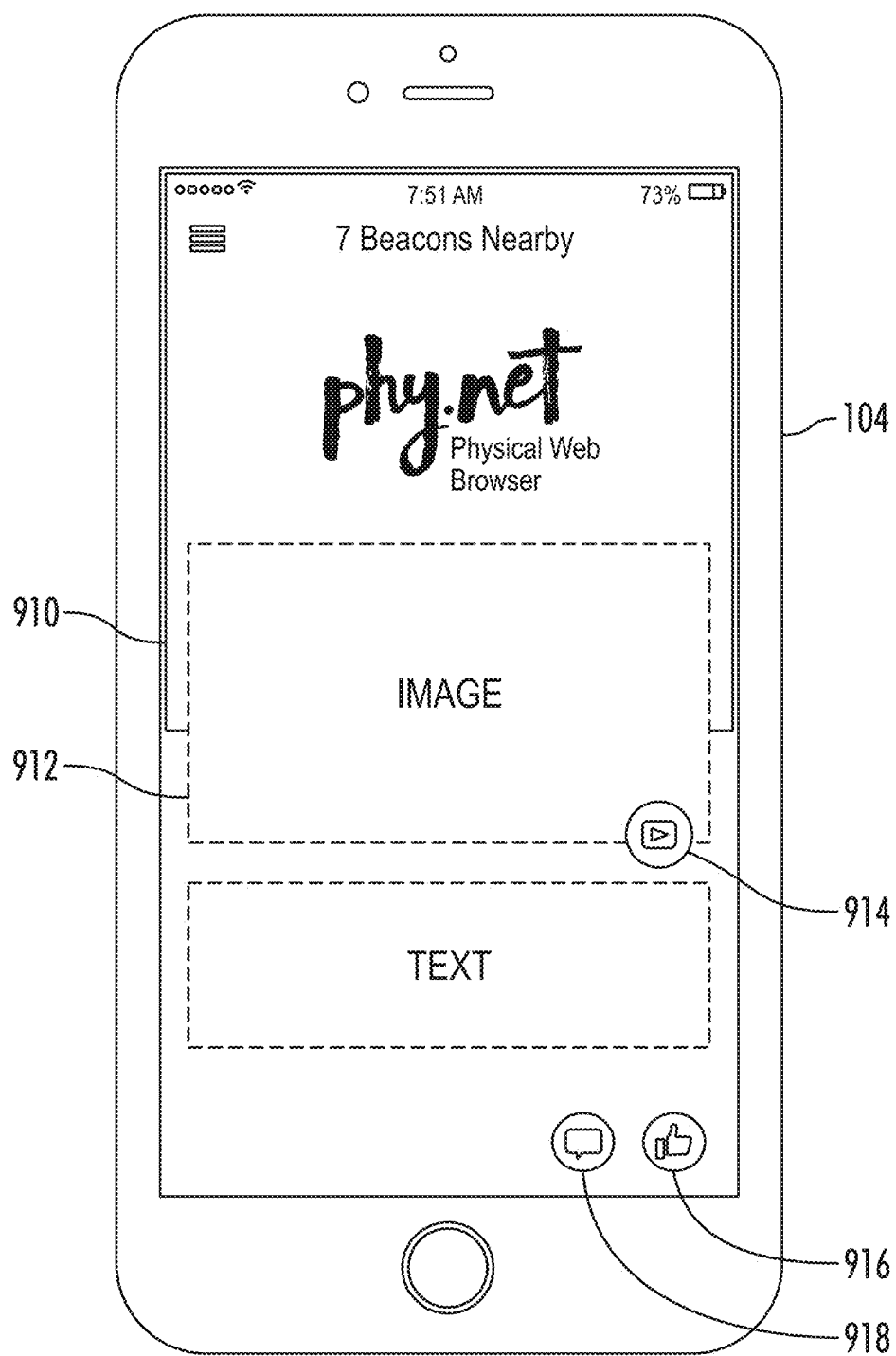
FIG. 9 is a modified screen shot representing selectable tokens and metadata generated in accordance with an embodiment of the present disclosure.

Referring to FIG. 9, in one exemplary embodiment a client device 104, upon obtaining a source URL from a proximate content source device 102, is configured to display preview metadata 912 for one or more selectable tokens 914, 916, 918 via a display unit 910. The preview metadata may include graphical images, text, videos, animations, etc., as designated by an authorized user via the hosted server interface, and essentially replaces the metadata that would otherwise be retrieved automatically via a third party destination website or the equivalent as associated with the destination URL. The selectable tokens may be generated on the same display and with respect to the same content source device but point to different destination URLs, including for example: a "content" token that takes the consumer directly to an underlying third party or hosted web portal; a "play" token 914 that executes an underlying video content; a "comment" token that enables the user to leave a comment regarding the associated content; and a "like" token that enables the user to favorably or unfavorably rate the associated content. In another example, the selectable token may visually represent a coupon for a given product or service, wherein the consumer may elect to decline selection of the coupon (and therefore avoid being redirected to an undesirable destination) or simply select the token and obtain the underlying coupon (i.e., put the coupon directly into an e-wallet or the equivalent).

As previously represented, the selectable tokens may relate to actions as well as underlying content to which the consumer may be redirected. For example, a content source device 102 as disclosed herein may be fixed in association with an adjacent controllable device such as a dimmable lighting element or other electronic appliance. Responsive to a content request indicating that a client device is proximate to the content source device and thereby to the controllable device, the hosted server may generate a reply message to the client device that generates a selectable token along with metadata indicating that the user can selectably control an operation of the device. Upon selection of the token, the SDK may redirect to a full URI associated with a control interface. For example, the reply message can include command information encoded within or otherwise appended to or associated with a destination URL, as well as an identifier for a controllable device. In certain embodiments, the command information may constitute a payload section of or appended to the destination URL, as integrating specific control commands associated with the controllable device, such as for example dimming values in association with an identified controllable lighting element. Such commands may be implemented via Web API protocols, wherein a custom interface is provided having command information and timing information for the controllable device encoded therein.

In another example, a selectable token may be associated with a messaging interface, wherein for example a destination URL returned from the hosted server may redirect to a full URI associated with a messaging platform on the client device and comprising messaging information (e.g., a phone number or a messaging ID). As one particular application, a content source device may be fixed in association with a point of entry to a building, wherein the destination URL provided by the hosted server is designated for the purpose of initiating a location-based electronic communication with one or more occupants of the building, including but not limited to execution of a chat session or an SMS message thereto. Alternatively, a chatbot dialog interface may be generated to provide advice or relevant information with respect to a location or associated product. Still further in the alternative, a chat session may be implemented between any of a plurality of authorized users selecting a token generated for a content source device within a specific geolocation, or a chat session initiated between a merchant and one or more users occupying a specific location within a merchant business such as a restaurant or retailer. In a particular embodiment, a dialog interface as described herein may further be accompanied with selectable tools, e.g., for attaching a captured image or other relevant information to outgoing messages.

As previously noted, one problem with conventional applications is that where multiple beacons broadcast the same URL, the source location of the user who accesses the beacons is lost. Various embodiments of a hosted system as disclosed herein address this problem by routing all beacon traffic through a central hosted server (e.g., PHY.net), which is thereby in a position to add source information back into the transition, thus allowing content providers to know exactly which beacon originated the beacon scan. This feature is further enabled by the presence of a unique identifier for each of the associated beacons.

In one particular example, a beacon in accordance with the present disclosure broadcasts its unique identifier in a format such as follows:

http://phy.net/ABC123, where "PHY.net" can be used by the beacon browser in accordance with the hosted server to translate this identifier into a destination URL or the like in accordance with for example a user (content owner) designation.

The hosted server may further coordinate with the beacon browser to generate a "source identifier" including a beacon's unique identifier with the destination URL as either a hash extension, or as a query variable, with the preferred implementation being a query variable. In one example, the respective beacon may broadcast:

http://phy.net/abc123, wherein the desired destination URL as for example designated by the content owner is:

http://discountcoupon1x1.com and further wherein the hosted server returns a message string including the destination URL and an exemplary query variable as follows:

http://discountcoupon1x1.com/?physource=abc123

By adding the original unique beacon identifier as a query variable to the end of the destination URL, through a variable ("physource"), the hosted server and by extension authorized users are able to associate the point of origin to the access of the destination URL (i.e., website). As such, the server hosting the website can use this information through its own database to determine the source location of the access, or the query variable ("physource") may be used via a hosted server API to retrieve information about the source location from the hosted server.

For illustrative purposes, consider the example where a merchant user associated with convenience stores implements the hosted server to bulk edit (building on features as previously noted herein) 1,000 beacons in 1,000 different stores all to point to the resource locator "https://beer-ad.com". As this website is accessed through beacons across the country, the merchant will of course know general statistics about the success of their promotion. However, through further implementation of a source identifier feature as disclosed herein, each click-through will arrive with a unique beacon identifier appended to each access that not only gives confirmation that the access originated from a beacon, it will provide the exact origin of each access. With the feature implemented, the destination URL will look like:

https://beer-ad.com?physource=abc123 for access thorough one beacon, and:

https://beer-ad.com?physource=xyz456 for access from another. With such information, the retailer will be able to see which store has the most accesses, or which areas of the country.

In accordance with various embodiments as disclosed herein, a system and method may enable or provide for additional extensions or query variables, as may be of value to a retailer or other content source. As one example, the hosted server may coordinate with beacon browsers to implement a GMT date/time stamp (e.g., using a query variable "phytime") of the initial beacon scan. Accordingly, a retailer may be able to calculate the time delay between a person's initial scan of a URL (i.e., when they were known to be present at the beacon location) and their actual selection and access to the destination URL. Such a time delay will typically indicate saved or shared access to a URL, which is valuable marketing information when combined with the location of the original access.

In an embodiment, the combination of a source identifier (e.g., using query variable "physource") and a time identifier (e.g., using query variable "phytime") may be used to create a unique transaction identifier. This unique transaction identifier may be stored in association with the UMS and implemented to stop multiple consumers from getting the same promotion, or forwarding a link to a promotion to consumers that are not present and otherwise eligible for a promotion. If a promotion is of real value, a user may request the website to validate their transaction identifier (e.g., "physource+phytime") via the host API, wherein if the transaction identifier does not exist in the historical record (or if it has already been used), then they are denied. Effectively, through the addition of these query variables, the host system has been able to transfer intelligence to a hosting web server through the URL, including the states of Location and Presence.

In certain embodiments, where for example it may be the case that more than one person is near the same content source device, and scan in the same second, the host server may itself or otherwise in coordination with a browser add a minimal amount of time or merely a number of additional decimal places (e.g., 0.000 ms) to the time (or a duplicate counter) such that a unique transaction identifier is made available for each and every scan transaction. Multiple appearances of the same transaction identifier, at times increasingly distant from the original access, may be used to track the later reference or sharing of a resource locator such as a web URL, as opposed to its access from someone physically present. When URLs which contain this transaction identifier are accessed, then multiple later accesses from this original access can be tracked, thus potentially telling marketers which promotions are most shared.

As another example, a user selectable campaign identifier (e.g., query variable "phycampaignID") may be appended to for example a source identifier or the like. Content owners may accordingly be able to choose a campaign identifier variable to be appended to destination content messages associated with all content source devices designated as being associated with a campaign, so that they can quickly track those accesses that come through the hosted server.

As yet another example, the hosted server may be configured to automatically generate a unique coupon (offer) variable (e.g., "phycouponID") for each access. Accordingly, when the coupon variable is required to be validated against the unique transaction identifier, the content owner or merchant may be assured that the offer can only be used by consumers who were actually present. In an exemplary embodiment, the system in accordance with each instance of the URL being accessed with a unique coupon variable will be able to display that unique coupon code, and retailers will be able to know how many codes were issued and redeemed.

Generally stated, a hosted server and associated browser (e.g., a conventional browser or SDK-implemented mobile app with browser capabilities) as disclosed herein leverages centralized administration of QR scans or beacon transmissions and interactivity to add variables to content URLs that are valuable in their own right, and are more valuable when used in combination, or when used with the host API to retrieve additional user-designated and hosted information.

As previously noted, websites currently have embedded content that is displayed by a browser upon search. In an embodiment, a system as disclosed herein may further enable the implementation or creation of proxy (i.e., "shadow") websites which may be associated with one or more destination websites and reside on the hosted server. These proxy websites may be in a position to control a consumer's interaction with a website, at least up until the time that the destination website is actually selected. When a beacon browser (e.g., Google Chrome or an SDK-enabled browser application) scans a physical web beacon configured in accordance with or otherwise compatible with features and parameters as disclosed herein, it queries the hosted server. Originally, the hosted server would act as a redirect server, and would return the destination URL, whereupon the beacon browser would retrieve information (such as for example the website's title, favicon, and description) from that destination website. Instead of the hosted server returning the destination URL, the shadow website on the hosted server in accordance with the exemplary embodiment disclosed herein may hold the connection and return dynamically set information (e.g., title, favicon, image, description) which are all easily updated by the customer on the host dashboard. When the shadow website is actually selected, the host will then redirect to the final destination URL (via, e.g., a JavaScript window location set, or via HTML5 http refresh with content set).

There are other foreseeable advantages to this approach beyond enabling dynamic control of the information (e.g., title, favicon, description) associated with a proxy website, independent of the underlying destination website. One such advantage may be that the host will be able to report click-through statistics to the website owner, which otherwise may be unavailable for the reason that browsers do not conventionally make a second call to the host or administrator when a customer selects a scanned destination URL.

Another advantage may be that a website owner will be able to clearly distinguish traffic generated from the hosted server and network of content source devices, as opposed to from other sources.

Yet another potential advantage may be that a shadow website as disclosed herein can monitor browser activity or otherwise implement devices and objects such as cookies which enable control of the destination content based upon a user's profile.

In accordance with various embodiments as disclosed herein, the web browser may be configured to append information to the source URL to be interpreted and acted upon by the UMS server. The appended information may include one or more variables for adding contextual information about the scanning event. For example, appended variables may include a unique customer identifier, an application identifier, user-selected preferences, etc.

In an embodiment, the browser may add the appended variables to the source URL to identify uniquely an associated application such as the beacon browser. For example, if a beacon URL is http://phy.net/abc123, the beacon browser may append a unique application identifier such as phyApp=377647a292333 (sample variable name and content), thereby generating a URL of http://phy.net/ABC123?phyApp=377647a292333.

In an embodiment, the core functionality of the beacon browser can be encapsulated in a Software Development Kit (SDK), which in turn, may be incorporated into a mobile app, thus giving that app the functionality of a beacon or QR browser. Appended variables may be defined in and applied by the SDK, thereby allowing a plurality of applications and beacon browsers to interact with the UMS and the Physical Web or other UMS associated content source devices in accordance with predetermined criteria, and thus making proximity content visible simultaneously in apps and browsers.

Various different variables can be appended by the beacon browser or SDK to add contextual information to be sent to the UMS server. For example, in an interaction where a customer is purchasing tour tickets, the browser may append "phyTour=child" (sample variable and content) to describe the type of tour the user has selected. Other example variables may identify individual retail stores, identify specific users, indicate user application selections, indicate user-selected preferences on the beacon application, and the like. A plurality of variables may be used, such as "phyTour=child" and "phyUser=VIP2A49." In certain embodiments, the beacon browser may combine a plurality of variables into a single, truncated URL suffix such as "phySDK=Aj501fj3" that can then be interpreted by the UMS server as its constituent variable parts.

By appending browser-based variables, the beacon browser can send contextual information unique to the transaction to the UMS server, enabling greater intelligence in retrieving and returning personalized content. Whereas the URI from the beacon identifies a user's location and proximity, beacon browser variables identify the user and the user's selected preferences. This allows the UMS server to determine not only the user's proximity to a given beacon and query content based upon that interaction, the UMS server can also add all of this information to the destination URL so as to allow the customization of that content based on user preferences set in the beacon browser application. Variables added to the content broadcast by a beacon during the interval when that transaction is handled by a browser, as opposed to variables added at the level of the beacon or at the level of the UMS, are particularly valuable for their ability to identify the user of the app and the user's preferences, whereupon this information may be used by the UMS to determine the content returned to the customer, or these variables may be appended to the destination URL for further processing by a different content management system.

A user may specify preferred brands or specials at the browser/SDK level, whereupon beacon-associated content can then be prioritized and returned in accordance with those preferences. For example, a user may specify that they are interested in promotions related to diabetes in an app making use of the SDK described herein, and that SDK can append the diabetes preference to the URL, thus enabling content so identified to be prioritized to that user. Alternately, information known about a customer may be automatically appended by the browser such as the user's device type. For example, for users of Android devices, content associated with or specified for Android devices may be returned instead of content associated with or specified for Apple devices (e.g. Google Play Store links as opposed to Apple App Store links). In further example, a user who has specified a preference for food specials over drink specials may receive information pertaining to food specials and no longer receive content about drink specials.

After reading the beacon URL and appending application-specified variables, the beacon browser broadcasts the combined URL to the UMS server. The UMS server then interprets the beacon-based suffix string separately from the browser-based suffix string. The UMS processes the browser-based suffix string to determine relevant information therefrom. Relevant information may include instruction information associated with content retrieval, where the suffix string modifies the content that would otherwise be retrieved via the beacon URL. For example, the suffix string may request a different type of page be returned, whereby the UMS server will return a different URL than that it would have returned in accordance with the URL beacon standing alone. In certain embodiments, relevant information may include non-content-based contextual information such as transactional information or analytics, e.g. time, application state, phone state, transaction history, GPS location, etc. This non-content-based contextual information may be valuable for content providers as consumer analytics.

The UMS server directs the beacon browser to or otherwise makes available for user selection a content server associated with the beacon URL and in accordance with any instructions provided via the browser-based suffix string. In certain embodiments, the UMS server may retrieve the destination URL associated with the beacon URI component of the received URL and then append query variables onto the destination URL, and these appended query variables may be the variables added by the browser, thus transferring them to the destination content server. These embodiments are advantageous in part because when the destination URL is shared by the user with other individuals, the unique query variables are retained, allowing the UMS server to track how, when, by whom, and in some cases to whom the information was shared. Such granular information is particularly valuable to marketers in terms of tracking content popularity and visibility.

In some embodiments, information retrieval may be performed by the beacon browser in association with a combination of beacon URL information and user preferences. For example, the beacon browser may cache information in advance based upon predefined or heuristic instructions, such as where a user frequents certain beacons or when proximity to one beacon instructs the application to cache certain information. This form of caching may be particularly useful where Internet access is spotty, weak, or non-existent. For example, for a user who purchases a tour that goes through an area with poor data signal, the beacon browser may cache certain content associated with one or more beacons on the tour and in accordance with the specifications selected at the preliminary beacon. In said example, the user may have purchased a child's tour ticket, whereupon the beacon browser may cache tour information in advance and to be retrieved at certain beacons placed throughout the tour where internet access is known to be good. By caching this information, the beacon browser may return content based upon subsequent beacon proximities without having to send and retrieve information to and from the UMS.

In an embodiment, a proprietary beacon browser may enable a user to access certain secure or private content associated with the proprietary beacon browser and not others. In this manner, users browsing via specific applications may be able to receive unique content not accessible to other beacon browsers of a different type. For example, users of a branded retail application may be able to receive content such as coupon codes or promotional specials not accessible to users of a generic beacon browser. Because the URLs of beacons or other content source devices are universally available, the same beacon message broadcast could return different content to an open browser than to a proprietary browser.

Proprietary browsers further allow for various types of Physical Web applications beyond dynamic web content access. In certain embodiments, the browser may append a security key in addition to other variables. The appended key may be the same security key associated with the beacon or may be an independent key usable with other types of content source devices. The security key may be appended in association with a particular user who has used login credentials with the browser. Inclusion and detection of this key may enable the UMS server to return secured content. For example, a proprietary browser and key may enable an authorized user to access VIP content not available to users accessing the same beacons without a security key. This content may be further secured by making the key single-use, such that copies of the information sent by the secure browser will not also return the private content a second time. In another example, a security guard may be able to check into locations automatically by walking near specific beacons with the proprietary browser enabled.

One problem with beacons of any type is that they are difficult to deploy and manage in scale. When there are hundreds or thousands of identically looking devices together in large groups, it is difficult to organize them. When they have individual, permanent ID's, it becomes easier to identify individual beacons, and to keep them organized. It also becomes possible to deploy them randomly and then have the individual installers set up their location and organizational information, thus distributing the organizational task across multiple installers. But there is still complexity to his task because the individual installers have to have log-in privileges to the installation app or management platform, and they have to have basic instruction on what data needs to be defined and recorded for each installed beacon. If, for example, 2,000 beacons were deployed to 2,000 different store locations in a retail chain, one would effectively need 2,000 different installers to have the capability of logging into an installation app, or to a platform dashboard to define the actual installed location and store number of each beacon in order to later enable unique metrics to be collected for that beacon or for its content to be properly managed. It would therefore be desirable to have a methodology for beacons to effectively "self-install", whereby the expense of dispatching trained installers can be avoided, and where the task of managing log in credentials of thousands of temporary installers can be avoided. One of skill in the art may appreciate that a self-install process as disclosed herein is desirably applicable to other forms of content source devices, such as QR codes, as to way to efficiently associate location and other contextual variables therewith, but the beacon self-install embodiment is described in detail herein for illustrative purposes.

Embodiments of a system disclosed herein may enable a simplified deployment methodology for beacons where broadcasts are directed to self-install web pages, accessible by browsers. In such embodiments, the beacon is effectively announcing itself on an openly accessible web page and requesting that its location information be defined on that web page by someone nearby. Upon entry, this location information can be stored by the UMS, for later use for metrics or content management, and then the beacon can revert to broadcasting the content for its intended end users or the public at large. For example, if a beacon's ID is "ABC123", and the marketing entity deploying it wants to manage beacons and their marketing content by "store type" and "store number", then beacon "ABC123" can initially broadcast an installation web page titled "Beacon Number ABC123" followed by two requests for information, such as "please enter the store type (e.g. Target or CVS) _____" and "please enter the store number _____." With this approach, any store employee can place the beacon in a desired section of the store, and can access the beacon's self-install page with a browser, whereupon the critical information needed to manage the beacon is simply captured. This embodiment takes advantage of each beacon's unique ID, of the capability of an associated UMS to control the content broadcast by a beacon, and of the ability of that content to be accessed by a universal browser.

Another embodiment of this invention may allow the UMS to add a simple security code to the self-install page, for example a 3-digit PIN, such that the store personnel installing the beacons will have to enter this PIN in order to be able to enter the desired installation information. This simple security PIN can be applied across all of the many beacons in a deployment to make sure that informed employees are entering the installation information.

Still another embodiment of the invention will make these self-install web pages dynamic, such that the information to be collected is defined in the UMS by the beacon owner, thus simplifying the installation process by only collecting only the exact information needed for each installation or promotion. For example, if all that is relevant to a deployment is the store number, then the self-install web page will only request this one piece of information.

Another embodiment of this invention will allow the beacons owner to reinitiate the self-install feature at any time, either for groups or for single beacons. For example, if 1000 beacons are installed for a certain 90-day promotion, then these beacons may be collected at the end of that promotion, and may then be redeployed, whereupon a new instruction to self-install will cause the previous location information to be deleted and new self-install web pages will be generated for broadcast by the beacons to collect the location information needed for the new promotion.

In still other embodiments of this invention the USM will be able to schedule a group of group of beacons to enter self-install mode, will be able to automatically lower the viewing range of beacon when in install mode to keep installation pages from being seen by distant persons, and to stop the collection of metrics during install mode to keep these accesses form skewing any collected marketing metrics.

In another embodiment, when beacons broadcast both iBeacon and Uribeacon protocols (including Eddystone-URL), a self-install web page could be used to self-install iBeacons, where the web page is used to associate unique iBeacon major and minor identifiers with the collected location information.

Figure 5:
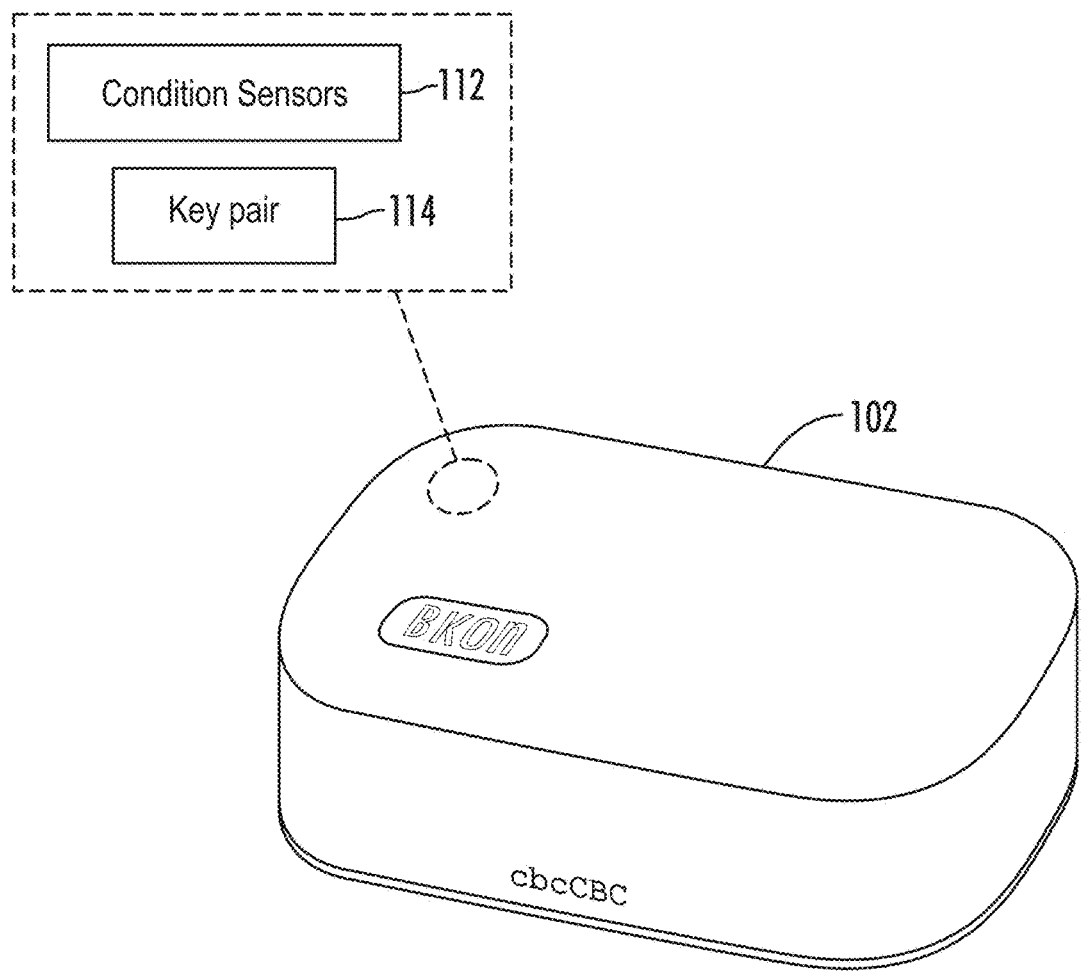
FIG. 5 is a perspective diagram representing an embodiment of a hosted beacon according to the present disclosure.

With reference to FIG. 5, an exemplary beacon 102 may be configured with one or more condition sensors 112 such as for example battery power as further described herein, and may further store information corresponding to an asymmetric key pair 114 or the like for beacon authentication.

Figure 6:
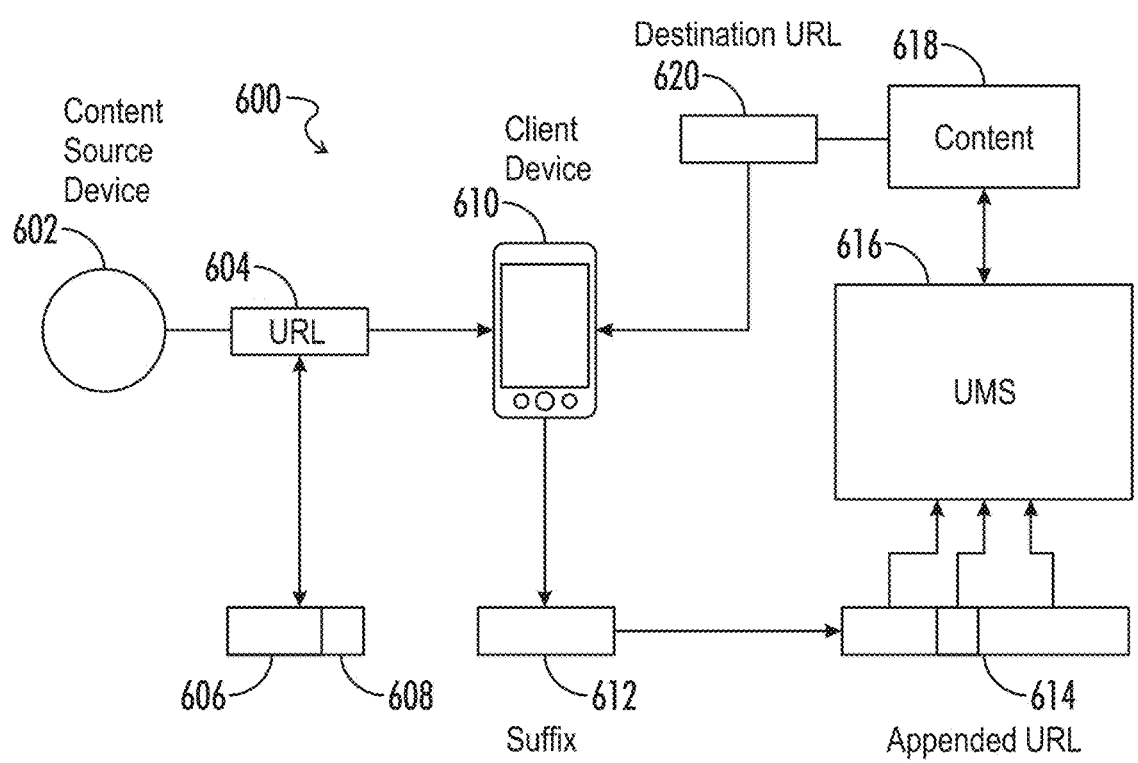
FIG. 6 is a flow diagram representing an embodiment of an application-based hosted web server system according to the present disclosure.

Referring to FIG. 6, an exemplary embodiment of a system 600 as disclosed herein may include a beacon 602 configured to broadcast a URL 604. The URL 604 may be comprised of at least a domain address component 606 and a unique beacon ID 608, wherein the beacon ID 608 is a unique identifier for the associated beacon 602. The URL 604 may comprise an access protocol and hosted server (e.g. http://YY.net) as the domain address component 606 and a PhyID (e.g. "ABC123") as the beacon ID 608, such that in combination the two form a complete URL (e.g. http://YYY.net/ABC123).

The beacon 602 is configured to broadcast the URL 604 to one or more proximate client devices 610 configured to receive the broadcast. In certain embodiments, the client device 610 may be a mobile device such as a mobile phone, netbook, or laptop. In certain embodiments, the beacon 602 may be geographically fixed, whereas in other embodiments the beacon 602 may be geographically mobile. The broadcast may be in the form of various wireless radio transmission protocols such as Bluetooth, RFID, and similar broadcast forms and frequencies including even for example data encoded audio or light signals, which the client device can interpret in accordance with its radio sensors.

Upon receiving the broadcast, the client device 610 may in some embodiments be configured to append a suffix 612 to the URL 604, thereby generating an appended URL 614. The client device 610 may execute instructions from a browser or application, said browser or application configured to append a suffix to one or more URLs 604 broadcast by beacons 606. In some embodiments, the suffix 612 may comprise one or more information tags. The information tags may embody additional contextual information to be added to the URL 604. Additional contextual information may include, for example, software settings or sensory data such as: user ID, application ID, user query, user settings, software setting state, phone state, date and time, temperature, acceleration, direction, light levels, and the like. Each information tag may pertain to a single setting or multiple settings. For example, the browser or application may be configured to generate a string unique to a plurality of settings and append that string as the suffix 612 to create an appended URL 614 (e.g., "http://YYY.net/ABC123/fj893H5jzXR"). In alternative embodiments, the browser or application may append information tags for each variable (e.g., http://YYY.net/ABC123/?PhyUser=john.doe&PhyApp=12843&query=vegan+menu+options"). In further alternative embodiments, the appended URL 614 may be the same as the URL 604 when the suffix 612 is empty or otherwise not added.

Upon appending the suffix 612 the client device 610 queries the appended URL 614, wherein the appended URL 614 directs to a UMS server 616. The UMS server 616 interprets the submitted URL request and processes the constituent components of the appended URL 614. The UMS server 616 may determine the domain address component 606, the unique beacon ID 608, and the one or more information tags of the suffix 612 and interpret those components in reference with a content server 618. In some embodiments, the content server 616 and UMS server 616 may be the same. In some embodiments, the UMS server 616 may process the information tags which pertain to logistical or metric information and remove those tags from the submitted URL request, thereby generating a new URL for accessing content associated with at least the hosted beacon 602 and, as determined by the UMS server 616, associated with the one or more suffix tags. For example, in an embodiment the UMS server 616 may reference a set of content associated with the beacon ID 608 and determine a subset of that content based upon one or more of the information tags of the suffix 612, where the information tags provide contextual information for the content.

In response to a content request from a device, the UMS server 616 generates a destination URL 620, with the appended contextual variables, for the determined content on the content server 618 and delivers that destination URL to the client device 610. The client device 610 may submit a plurality of content requests to the hosted server 616 where for example broadcasts from numerous beacons have been received by the device with respect to a single location. In this case, the hosted server 616 may return one or more destination URLs 620 to the device 610 in accordance with the plurality of content requests. The destination URLs 620 may be presented via the device as a selectable list of tokens in the form of content or action options, in the common form of an internet search display. The selectable tokens incorporate visual information for display on the search display, which may include for example destination website metadata (e.g., pertaining to images, favicons, titles, descriptions and the like), and may further comprise a hyperlink URL that is accessed when the user selects the associated token. This hyperlink may be third party or it may be at the hosted server. Accordingly, the browser or application on the client device 610 receives contextually specific content via the destination URL 620 in reference to the proximate beacon 602.

In some embodiments, the UMS server 616 may include additional information tags on the destination URL 620 whereby the application or browser on the client device 610 is configured to read, interpret, and act upon the added information tags. For example, the destination URL 620 may contain information tags which provide instructions for rendering the content, which authenticate content in accordance with a security key, which instruct the application to perform certain actions, and the like.

In certain embodiments, the beacon ID 608 may comprise in whole or in part a rotating set of beacon IDs over time. In such embodiments, the beacon may be configured to periodically change the beacon ID, or in certain embodiments relevant portions of a beacon ID, to be broadcast in accordance with software instructions. For example, such a "dynamic beacon ID" as referred to herein may be incremented or transformed periodically in accordance with a cryptographic algorithm, such as a hash, such that the hosted beacon 602 does not retain a singular beacon ID for more than a set period of time. In other embodiments, a plurality of beacon IDs may be associated with the device, wherein the beacon ID to be broadcast at a given time is algorithmically selected. In an embodiment, the beacon ID may be an eight-byte key. In certain embodiments, the dynamic beacon ID 608 may be supplemented with additional information such as for example a battery state for the hosted beacon 602 (i.e., producing a "dynamic beacon URL").

Figure 7:
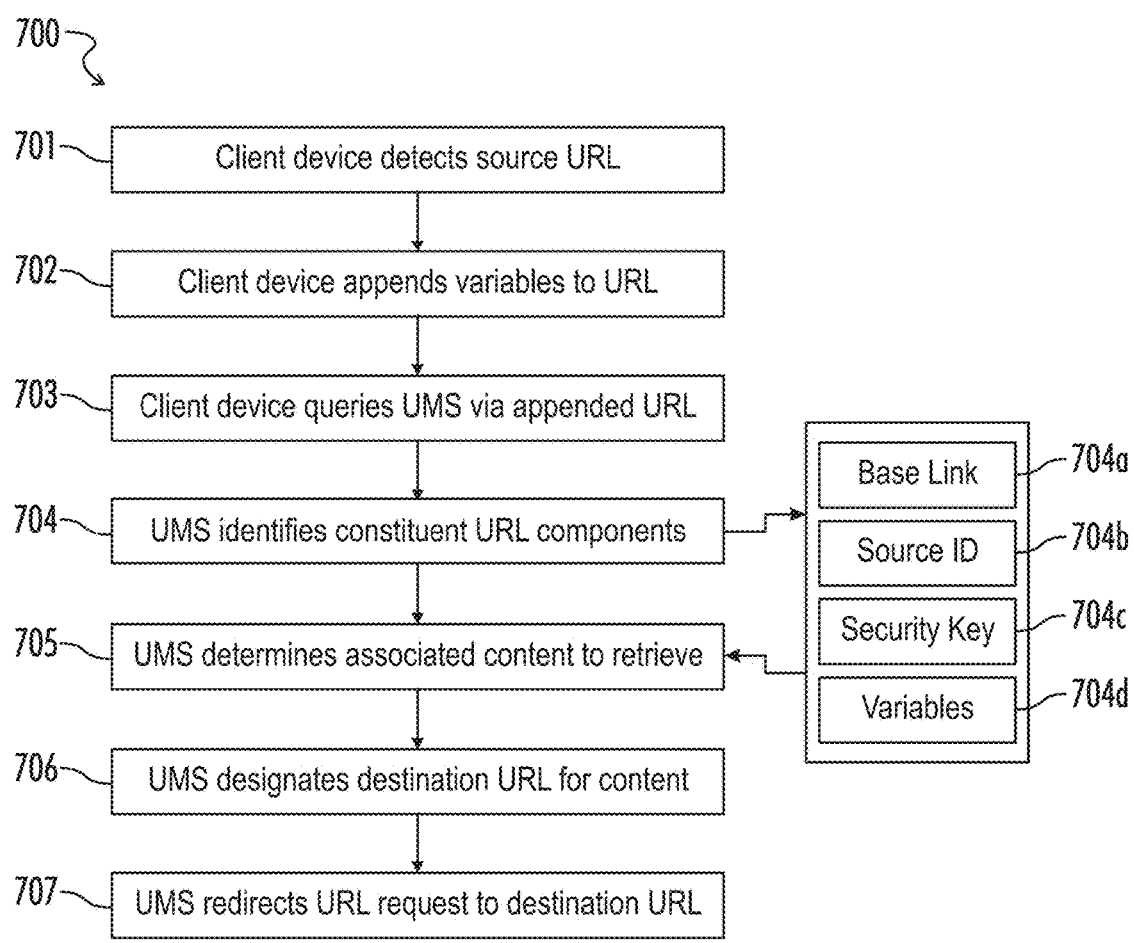
FIG. 7 is a flow diagram representing an exemplary embodiment of a URL interpretation and retrieval method according to the present disclosure.

Referring now to FIG. 7, an exemplary method 700 as disclosed herein for retrieving content as referenced above and particularly in regard to FIG. 6 may be described as follows. The method 700 may be characterized in part wherein a client device is configured to perform a first step 701 wherein the client device obtains a source URL such as for example via a QR code scan or as broadcast by a beacon. The client device may detect URL broadcasts via various sensors such as proximity-based wireless protocols such as RFID, WiFi, Bluetooth, and the like, the client device sufficiently proximate to the beacon to detect the broadcast.

The method 700 may further be characterized in part by the step 702, wherein the client device, via an associated browser or application, appends zero, one, or more variables to the received URL in accordance with software instructions therein, thereby generating an appended URL. In some embodiments, the appended variables may embody contextual information about the client device or client state, or device user wherein the beacon URL transmits information pertinent to the beacon (e.g. PhyID, battery state, location) in the URL and the client device appends device-based information such as user settings, user input, device state, software state, and proximity to the beacon. In an embodiment, the client device may append a series of variables, wherein each variable corresponds to an individual quantum of information; alternatively, the client device may append a variable string, wherein the string represents a quanta of information.

The method 700 may further be characterized in part by step 703, wherein the client device queries a UMS server via the appended URL. The client device may be connected to the UMS server via a communications network. In some embodiments, the UMS server may be hosted at the location specified in the broadcast URL, whereby the appended variables provide the UMS server information to be processed.

The method 700 may further be characterized in part by step 704, wherein the UMS server identifies the constituent components of the URL and obtains contextual information therefrom. For example, the UMS server may identify the base URL link which directs the client device to the UMS server location on the communications network (704*a*). The UMS server may further identify the beacon ID (704*b*) and determine from a database the unique beacon, beacon location, and controlling account to which that beacon is assigned. In some embodiments, the beacon URL may contain information pertaining to the battery state of the beacon, whereby the UMS server identifies the battery level remaining in the beacon. The UMS server may further identify a public security key (704*c*) and a continuously changing key which is based on a private security key stored upon the UMS server as an asymmetrical key pair verification method. In some embodiments, the public security key may be a component of or may be itself the beacon ID; in alternative embodiments, the public security key may be an appended variable. The UMS server may further identify from the beacon ID the one or more appended variables (704*d*).

The method 700 may further be characterized in part by step 705, wherein a hosted content server or third party content server may use the components identified in step 704 to return more relevant content to the client device. In one embodiment, the UMS server may internally process certain components (e.g., battery state) while appending or embedding other components with respect to a destination URL, wherein the appended variables may provide delimitations for the content server as to a subset of the associated content. For example, where an appended variable states the browser type being used on the client device, the UMS server may pass the appended variable on the content server to facilitate downstream content selection and delivery. In embodiments wherein the UMS server is the content server, the UMS may use the appended variable to help determine an arrangement of content compatible for display via the stated browser. In some embodiments, the UMS server may process certain components and/or variables irrespective of the content to be retrieved, wherein such components and/or variables provide non-content-based information such as marketing metrics. For example, the UMS server may separately process a timestamp of the original access, a phone activity state, a user ID, or other such information which will not affect the selection, curation, or display of content to be retrieved.

The method 700 may further be characterized in part by step 706, wherein the UMS server designates a destination URL for the content to be retrieved in accordance with the determinations made in step 705. The destination URL may in some embodiments be a unique URL for the display of the specific set or subset of content determined. In some embodiments, the destination URL may direct to a third-party content management server. In certain embodiments, the UMS server may further append variables to the destination URL as contextual information to be processed by the third-party content management server. The appended variables may in some embodiments provide non-content information for purposes of marketing and metric information.

The method 700 may further be characterized in part by step 707, wherein the UMS server redirects the client device's original URL request to the destination URL by returning the destination URL to the client device, thereby providing the client device the content determined in step 705. In some embodiments, the UMS server may further append variables to the destination URL as contextual information or instructional information to be processed by the client device's browser or application. In various embodiments, the variables appended to the original URL by the beacon or the browser can be transferred to the destination URL by the UMS, thus effectively transferring them to the content server where they have the greatest usefulness.

Figure 8:
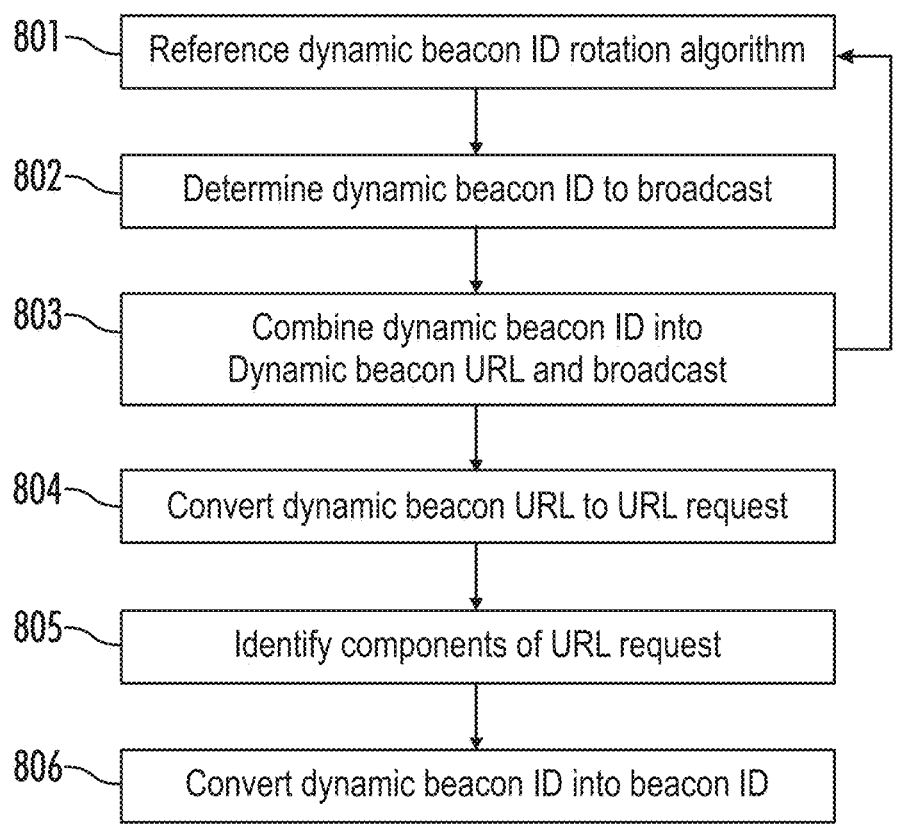
FIG. 8 is a flow diagram representing an embodiment of a URL security method as disclosed herein.

FIG. 8 may in some embodiments be interpreted in conjunction with FIGS. 6 and 7. A URL security method 800 begins at a first step 801 when a hosted beacon references an ID rotation algorithm to dynamically determine a beacon ID to broadcast, the algorithm associated with the periodic rotation of beacon IDs. In certain embodiments, the ID rotation algorithm may be partially or wholly defined by a beacon owner; for example, a beacon owner may be able to specify the periodic frequency by which an ID rotates. In an embodiment, the ID rotation algorithm may be a cryptographic algorithm, such as a hash value, which securely increments the ID periodically in accordance with an algorithmic key. In an embodiment, the dynamic beacon ID may be generated based upon a private key embedded into each beacon and known to the UMS, as previously discussed. The dynamic beacon ID accordingly includes or embodies an 8-byte public key, wherein the public key may be authenticated in accordance with the server-stored private key, the two keys forming an asymmetric key pair for server-side authentication from among a plurality of dynamic beacon IDs available to the respective beacon.

The method 800 continues in step 802 when the beacon determines in accordance with the ID rotation algorithm which beacon ID to broadcast for a specific duration and broadcasts that dynamic beacon ID. Each beacon ID in the series of beacon IDs to be broadcast over time may be temporarily broadcast for an algorithmically specified or fixed duration of time before proceeding to the next beacon ID in the series. The progression of beacon IDs may be preferably seemingly random, though algorithmically defined, such that a person cannot distinguish the incrementation method or identity of subsequent beacon IDs to be generated.

The method 800 continues in step 803 wherein the beacon generates and broadcasts a beacon URL which may take the form of a base URL and suffix, such as: https://phy.net/EID_URL+Batt. For example, a dynamic beacon URL may be https://phy.net/A046G5SQBA35, wherein "https" is the transfer protocol, "phy.net" is the URI base, A046G5SQ is the current beacon ID, and BA35 is the battery state. In said example, the beacon ID may change periodically in accordance with steps 801 and 802, and the battery state may change in accordance with the status of the battery (e.g. charge, capacity, health, etc.) of the beacon battery; accordingly, the URL broadcast by the host beacon changes periodically and continuously. Steps 801 through 803 may be performed continuously. In certain embodiments, it may be understood that variables associated with condition sensors such as for example the battery state may be optional in nature or simply unavailable for some applications.

In step 804, a proximate mobile device receives the broadcast beacon URL, interprets at least a portion of the beacon URL as a destination URL for a browser or software application, and queries the URL in said browser or software application. In certain embodiments, the host beacon may append suffix information to be used by the UMS and/or further appended by the mobile device's software application in accordance with FIGS. 6 and 7 herein.

In step 805, the UMS receives the mobile device's URL query and identifies the constituent components of the beacon URL, including at least the dynamic beacon ID. In step 806, the UMS compares the dynamic beacon ID to a UMS-ID registry to validate the dynamic beacon ID as authentic. If the received dynamic beacon ID matches a valid registry entry associated with a specific beacon, then the UMS will convert the dynamic beacon ID into a specific beacon ID (step 806). In certain embodiments, the UMS may continue in accordance with method 700. If the dynamic beacon ID does not match a valid registry entry, the UMS may redirect the browser or application to a URL, or direct the browser or application to content, associated with non-valid entries. For example, if an invalid or outdated dynamic beacon ID is received, the UMS may direct the browser to a page that states that the information a user is seeking has expired, or to a different, possibly limited set of content. In certain embodiments, the registry may be updated in accordance with beacon owner preferences such that changes to the beacon ID algorithm for dynamic beacon ID key generation will be reflected in the registry key for comparative purposes. In an embodiment, a beacon owner may update the registry through a secure web portal to the UMS. Said web portal may, for example, be the administrative web portal 400 as described in FIG. 4.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

As defined herein, the term "beacon" may at least refer to devices with short range communications, configured to transmit wireless signals detectable by mobile devices proximately located thereto. Examples of such beacons may typically include, but unless otherwise stated are not expressly limited to, radio frequency (RF) beacons (e.g., those configured to transmit Bluetooth™ Low Energy (BLE) signals), and may further be configured for fixed application (e.g., a battery powered beacon mounted to a known location), or for mobile application (e.g., a USB beacon mountable to a mobile device). The term "beacon" may indeed be attributed broader scope than normal with respect to one of ordinary skill in the art, but is intended herein unless otherwise expressly stated to incorporate alternative devices implementing equivalent location based technologies such as for example near field communication (NFC) protocol or a QR code.

As used herein, the term "beacon browser" may at least refer to web browsers operable with respect to a user computing device, and which are configured when enabled or otherwise operating on the computing device to continuously or user-selectably scan for and detect wireless signals transmitted by beacons proximately located thereto, in a manner understood by those of skill in the art. Such beacon browsers may typically be configured to display information corresponding to destinations, content and/or objects associated with the scanned beacons, and further to enable user selection, execution and/or linking to such destinations, content and/or objects. In some embodiments, the beacon browser may refer to a non-browser computer program such as a mobile phone application configured to display information on a display.

The term "user interface" as used herein may unless otherwise stated include any input-output module with respect to the hosted server including but not limited to web portals, such as individual web pages or those collectively defining a hosted website, mobile applications, desktop applications, telephony interfaces such as interactive voice response (IVR), and the like. Such interfaces may in a broader sense include pop-ups or links to third party websites for the purpose of further accessing and/or integrating associated materials, data or program functions via the hosted system and in accordance with methods of the present invention.

The term "communications network" as used herein with respect to data communication between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISP's), and intermediate communication interfaces.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:
1. A system comprising:
a plurality of proximately located QR codes at respective fixed locations, each associated with a source Uniform Resource Locator (URL) comprising a domain associated with a hosted server and a unique identifier;
wherein the hosted server is configured to generate a hosted user interface enabling designation by an authorized user of one or more destination URLs for one or more of the respective QR codes;
a client device configured upon obtaining the source URL from one or more QR codes to
generate one or more selectable tokens comprising preview metadata corresponding to each of the one or more QR codes, and
further upon user selection of one of the one or more tokens, to generate an associated request to the hosted server; and
wherein the hosted server is configured, upon receiving the request from the client device, to generate a return message to the client device comprising at least one of the one or more destination URLs designated for the respective QR code,
wherein preview metadata associated with each of the QR codes is dynamically generated in association with sequential capture of the respective QR codes by a camera of the client device, and
wherein the camera remains active as the client device moves from a first QR code to a second QR code, wherein the one or more selectable tokens generated from the preview metadata for the first QR code remain visible and active until the camera scans the second QR code, whereupon the visible selectable tokens automatically change.

2. The system of claim 1, wherein the hosted user interface further enables designation by the authorized user of the preview metadata in association with the one or more destination URLs for the respective QR codes.

3. The system of claim 2, wherein the hosted server further comprises one or more proxy websites associated with a respective destination URL,
the client device is configured, based upon the obtained source URL from the one or more QR codes, to generate the one or more selectable tokens comprising the designated preview metadata corresponding to the one or more proxy websites that are associated with the designated destination URL.

4. The system of claim 3, wherein each selectable token is associated with a different destination URL.

5. The system of claim 1, wherein the destination URL is configured for regulating one or more operating parameters for a controllable device proximate to the client device, and further comprises command information and an identifier for the respective controllable device.

6. The system of claim 1, wherein the destination URL is configured for a messaging application associated with the client device, and further comprises contextual location information for a new message from the client device.

7. The system of claim 1, wherein the request from the client device comprises the source URL and one or more contextual information tags appended thereto by the mobile application, and
wherein the hosted server is configured, upon receiving the request from the client device, to process the one or more contextual information tags appended in the URL of the request, and to generate the return message to the client device comprising the designated destination URL based at least in part on one or more of the contextual information tags.

8. The system of claim 7, wherein the contextual information tags appended by the mobile application comprise variables associated with unique user identification and user-selected preferences set in the mobile application, and
wherein the hosted server is configured to generate the return message including one or more destination URLs based at least in part on one or more of the identified user and the user-selected preferences.

9. The system of claim 7, wherein the contextual information tags appended by the mobile application comprise a security key associated with a particular user having login credentials with the mobile application, and
wherein the hosted server is configured to generate the return message including a destination URL with secured content, based on the identified user and the security key.

10. The system of claim 7, wherein the appended contextual information tags from the mobile application comprise a first set of appended contextual information tags, and the hosted server is further configured to append a second set of one or more contextual information tags to the destination URL in the return message to the client device, and
the client device is effective to provide access to content based on one or more of the first and second sets of contextual information tags and the destination URL in the return message.

11. The system of claim 1, wherein the request from the client device includes position information appended to the source URL, wherein the host server is configured to determine a location of the client device as proximate to the corresponding QR code, and at a particular time.

12. The system of claim 1, wherein the hosted server is configured, upon receiving the request from the client device, to request validation of a location of the client device as proximate to the corresponding QR code,
the client device is enabled to respond to the validation request with one or more captured images of an area corresponding to a location of the QR code, and
the hosted server is configured, upon validating the location of the client device via processing of the one or more captured images, to generate the return message to the client device comprising at least one of the one or more destination URLs designated for the respective QR code.

13. The system of claim 1, wherein the request from the client device includes identifiers for one or more beacon transmitters proximate to the client device, wherein the host server is configured to determine a location of the client device as proximate to the corresponding QR code content source device.

14. A method comprising:
enabling via an online user interface designation of one or more destination Uniform Resource Locators (URLs) and associated preview metadata for each of a plurality of QR codes, each QR code being further associated with a specific fixed location;
obtaining one or more source URLs from at least one QR code at a location proximate to the respective fixed location, each of the source URLs comprising a domain associated with a hosted server and a unique identifier associated with the respective QR code;
dynamically generating in a browser interface one or more user-selectable tokens comprising preview metadata corresponding to each of the one or more QR codes, in association with sequential capture of the respective QR codes;
wherein the one or more selectable tokens for a first QR code remain visible and active until a second QR code is scanned, whereupon the visible selectable tokens automatically change;
upon user selection of one of the one or more tokens, generating an associated request to the hosted server; and
receiving a return message from the hosted server, comprising one of the one or more destination URLs designated for the respective QR code.

15. The method of claim 14, wherein the destination URL further comprises command information and an identifier for a controllable device proximate to the QR code, and the method further comprises:
regulating one or more operating parameters for the controllable device based on the command information.

16. The method of claim 14, wherein the destination URL further comprises one or more of recipient information and content information, and the method further comprises:
generating a chat group, chatbot dialog box or an outgoing message based on the one or more of recipient information and content information.

17. The method of claim 14, further comprising enabling via the online user interface designation of the preview metadata in association with the one or more destination URLs for the respective QR codes.

18. The method of claim 17, further comprising generating the one or more selectable tokens comprising the designated preview metadata corresponding to one or more proxy websites that are associated with the designated destination URL.

19. The method of claim 18, wherein each selectable token is associated with a different destination URL.

* * * * *